US009680813B2

(12) United States Patent
Sade et al.

(10) Patent No.: US 9,680,813 B2
(45) Date of Patent: Jun. 13, 2017

(54) USER PROVISIONING

(71) Applicant: Cyber-Ark Software Ltd., Petach-Tikva (IL)

(72) Inventors: Yair Sade, Herzlia (IL); Roy Adar, Kiryat-Tivon (IL); Yossi Dantes, Petach-Tikva (IL); Tzippi Yitzhack, Ramat-Gan (IL); Andrey Dulkin, Herzlia (IL)

(73) Assignee: Cyber-Ark Software Ltd., Petach-Tikva (IL)

( * ) Notice: Subject to any disclaimer, the term of this patent is extended or adjusted under 35 U.S.C. 154(b) by 109 days.

(21) Appl. No.: 14/479,498

(22) Filed: Sep. 8, 2014

(65) Prior Publication Data

US 2016/0006712 A1    Jan. 7, 2016

Related U.S. Application Data

(63) Continuation-in-part of application No. 14/372,772, filed as application No. PCT/IL2013/050849 on Oct. 22, 2013.

(Continued)

(51) Int. Cl.
*H04L 29/06* (2006.01)
*G06Q 10/06* (2012.01)

(52) U.S. Cl.
CPC ............. *H04L 63/08* (2013.01); *G06Q 10/06* (2013.01)

(58) Field of Classification Search
CPC ... H04L 63/08; H04L 63/0853; H04L 9/3234; G06Q 10/06
See application file for complete search history.

(56) References Cited

U.S. PATENT DOCUMENTS 6,285,680 B1    9/2001  Steinka et al.
6,286,104 B1    9/2001  Buhle et al.
(Continued)

FOREIGN PATENT DOCUMENTS

WO    WO 0051031 A1 *  8/2000    ....... G06F 17/30899
WO    WO 2013/088212      6/2013

OTHER PUBLICATIONS

"Best Practices for Securing Privileged Accounts" © 2012 Hitachi ID Systems Inc. (39 pages) http://web.archive.org/web/20121025025420/http://hitachi-id.com/privileged-access-manager/docs/privileged-access-management-best-practices.pdf.*

(Continued)

*Primary Examiner* — Joseph P Hirl
*Assistant Examiner* — Thomas Gyorfi

(57) ABSTRACT

A method of credential provisioning on a target service utilizes three credential sets: authentication credentials, privileged credentials and provisioned credentials. An intermediate element receives a request from a user client to establish a session with a target service. The request includes authentication credentials. The intermediate element creates provisioned credentials using privileged credentials which are authorized for creating provisioned credentials for accessing the target service. Once provisioned credentials have been created, a dual session communication channel is established between the user client and the target service. The session between the user client and intermediate element is established using the authentication credentials and the session between the intermediate element and the target service is established using the provisioned credentials. Optionally, user authorization to establish a session with the target service is determined prior to creating the provisioned credentials.

38 Claims, 29 Drawing Sheets

Related U.S. Application Data

(60) Provisional application No. 62/021,234, filed on Jul. 7, 2014, provisional application No. 61/717,656, filed on Oct. 24, 2012.

(56) References Cited

U.S. PATENT DOCUMENTS

| | | | |
|---|---|---|---|
| 6,986,040 | B1 | 1/2006 | Kramer et al. |
| 7,187,678 | B2 | 3/2007 | Cunetto et al. |
| 7,961,736 | B2 | 6/2011 | Ayyagari |
| 8,499,147 | B2* | 7/2013 | Ikeda .................. G06F 21/32 713/155 |
| 9,130,935 | B2* | 9/2015 | Somani .............. H04L 63/0815 |
| 9,282,097 | B2* | 3/2016 | Agarwal ................ G06F 21/41 |
| 2005/0129026 | A1 | 6/2005 | Chang et al. |
| 2006/0101510 | A1* | 5/2006 | Kadyk ................ H04L 63/0281 726/12 |
| 2006/0225132 | A1* | 10/2006 | Swift ...................... G06F 21/33 726/11 |
| 2008/0056286 | A1 | 3/2008 | Forssell et al. |
| 2008/0196101 | A1 | 8/2008 | Sade et al. |
| 2011/0231651 | A1* | 9/2011 | Bollay ................. H04L 63/166 713/152 |
| 2011/0277016 | A1 | 11/2011 | Hockings et al. |
| 2011/0321120 | A1 | 12/2011 | Saxena et al. |
| 2012/0072592 | A1 | 3/2012 | Lidstrom et al. |
| 2012/0124205 | A1 | 5/2012 | Muret et al. |
| 2012/0284786 | A1* | 11/2012 | Somani .............. H04L 63/0815 726/7 |
| 2013/0191631 | A1* | 7/2013 | Ylonen .............. H04L 63/1483 713/153 |
| 2014/0181939 | A1 | 6/2014 | Bonnell |
| 2014/0365653 | A1 | 12/2014 | Matoba |
| 2015/0082396 | A1* | 3/2015 | Theebaprakasam .... H04L 63/08 726/5 |
| 2015/0200821 | A1 | 7/2015 | Sade et al. |
| 2015/0222604 | A1* | 8/2015 | Ylonen ................. H04L 63/062 713/171 |
| 2015/0271162 | A1 | 9/2015 | Dulkin et al. |
| 2015/0326435 | A1 | 11/2015 | Tamura et al. |
| 2016/0006765 | A1 | 1/2016 | Shem Tov et al. |
| 2016/0142914 | A1 | 5/2016 | He et al. |
| 2016/0198403 | A1 | 7/2016 | Sumiuchi |

OTHER PUBLICATIONS

"Securing Priviledged Accounts with Hitachi ID Privileged Access Manager" © 2012 Hitachi ID Systems Inc. (18 pages) http://web.archive.org/web/20121025030502/http://hitachi-id.com/privileged-access-manager/docs/securing-privileged-accounts-with-hitachi-id-pam.pdf.*
Applicant-Initiated Interview Summary Dated Jun. 10, 2015 From the US Patent and Trademark Office Re. U.S. Appl. No. 14/217,649.
European Search Report and the European Search Opinion Dated May 15, 2015 From the European Patent Office Re. Application No. 15150412.3.
Official Action Dated Jun. 17, 2015 From the US Patent and Trademark Office Re. U.S. Appl. No. 14/217,649.
Applicant-Initiated Interview Summary Dated Feb. 23, 2016 From the US Patent and Trademark Office Re. U.S. Appl. No. 14/217,649.
Official Action Dated Feb. 1, 2016 From the US Patent and Trademark Office Re. U.S. Appl. No. 14/154,200.
Hitachi Privileged-Access-Management, Hitachi ID Systems, Inc., 2 Pages, 2016.
Official Action Dated Feb. 26, 2015 From the US Patent and Trademark Office Re. U.S. Appl. No. 14/217,649.
Centrify Corporation "Centrify Server Suite: Unified Identity Management and Audit Across On-Premise and Cloud-Based Windows, Linux, and UNIX Servers", Data Sheet, Centrify Corporation, 2 P., 2014.
Citrix "Citrix XenServer. Industry-Leading Open Source Platform for Cost-Effective Cloud, Server and Desktop Virtualization", Citrix Systems Inc., Product Overview, 7 P., 2013.
Citrix "XenApp Smart Auditor", Citrix eDocs, Jan. 23, 2014.
CyberArk "Discovery & Audit", CyberArk DNA, Product Description Brochure, Cyber-Ark Software Company, 2 P., Nov. 2013.
CyberArk "Privileged Identity Management Suite 7.0", Cyber-Ark Software, Ltd., Version 7.2, 4 P., Aug. 23, 2013.
CyberArk "Privileged Threat Analytics™", CyberArk Software Ltd., 2 P., 2013.
Cyber-Ark "Application Identity Manager™", Cyber Ark Software, Ltd., Datasheet, 2 P.
Cyber-Ark "Application Password Management", Cyber-Ark Software Ltd., Datasheet, 2 P., Feb. 2007.
Cyber-Ark "Enterprise Password Vault™ 4.5", Cyber-Ark Software Ltd., Brochure, 4 P., Nov. 2007.
Cyber-Ark "On-Demand Privileges Manager™ for Unix/Linux", Cyber Ark Software, Ltd., Datasheet, 2 P.
Cyber-Ark "On-Demand Privileges Manager™ for Windows", Cyber Ark Software, Ltd., Datasheet, 2 P., 2009.
Cyber-Ark "On-Demand Privileges Manager™", Cyber-Ark Software Ltd., Brochure, 2 P., Apr. 2010.
Cyber-Ark "Privileged Identity Management 5.0", Cyber-Ark Software Ltd., Brochure, 4 P., Apr. 2009.
Cyber-Ark "Privileged Identity Management Suite 7.0", Cyber-Ark Software, Ltd., PIM Brocure, 4 P., 2010.
Cyber-Ark "Privileged Session Management Suite 7.0", Cyber Ark Software, Ltd., PSM Brochure, 4 P., 2010.
Cyber-Ark "Privileged Session Manager™", Cyber-Ark Software Ltd., Datasheet, 2 P., Mar. 2009.
Gartner PAM "Beyondtrust: PowerBroker Identity Services for Active Directory Bridging. Extend Microsoft® Active Directory Authentication and Single-On Capabilities + Group Policy Configuartion Management to UNIX, Linux and Mac Systems", Whitepaper, Gartner PAM Market Guide, 2 P., 2014.
Khan et al. "Oracle® Identity Manager: Connector Guide for UNIX, Release 11.1.1, E17694-06", Oracle, 128 P., Feb. 2014.
ObserveIt "Are You Monitoring Your Fastest Growing Threat? User-Based Threats: Identifying Suspicious Activities and Understanding Intent", ObserveIt, Overview Brochure, 2 P., Jan. 26, 2015.
ObserveIt "ObserveIT Enterprise User Activity Monitoring", ObserveIt, Product Documentation, Version 5.6.8, Jan. 23, 2014.
Oracle "Oracle Identity Manager 11g", Data Sheet, Oracle, 3 P., 2011.
Wikipedia "Remote Desktop Protocol", Wikipedia, the Free Encyclopedia, 7 P., Last Modified Sep. 16, 2014.
European Search Report and the European Search Opinion Dated Nov. 6, 2015 From the European Patent Office Re. Application No. 15173242.7.
Official Action Dated Nov. 6, 2015 From the US Patent and Trademark Office Re. U.S. Appl. No. 14/217,649.
Advisory Action Before the Filing of an Appeal Brief Dated Jul. 22, 2016 From the US Patent and Trademark Office Re. U.S. Appl. No. 14/217,649.
Official Action Dated Sep. 13, 2016 From the US Patent and Trademark Office Re. U.S. Appl. No. 14/792,828.
Official Action Dated Sep. 21, 2016 From the US Patent and Trademark Office Re. U.S. Appl. No. 14/217,649.
Applicant-Initiated Interview Summary Dated Apr. 18, 2016 From the US Patent and Trademark Office Re. U.S. Appl. No. 14/154,200.
Official Action Dated May 13, 2016 From the US Patent and Trademark Office Re. U.S. Appl. No. 14/217,649.
Wikipedia "Processor", From Wikipedia, The Free Encyclopedia, 2.P, May 7, 2016.
Applicant-Initiated Interview Summary Dated Nov. 17, 2016 From the US Patent and Trademark Office Re. U.S. Appl. No. 14/217,649. (4 pages).
Applicant-Initiated Interview Summary Dated Nov. 23, 2016 From the US Patent and Trademark Office Re. U.S. Appl. No. 14/792,828. (3 pages).

* cited by examiner

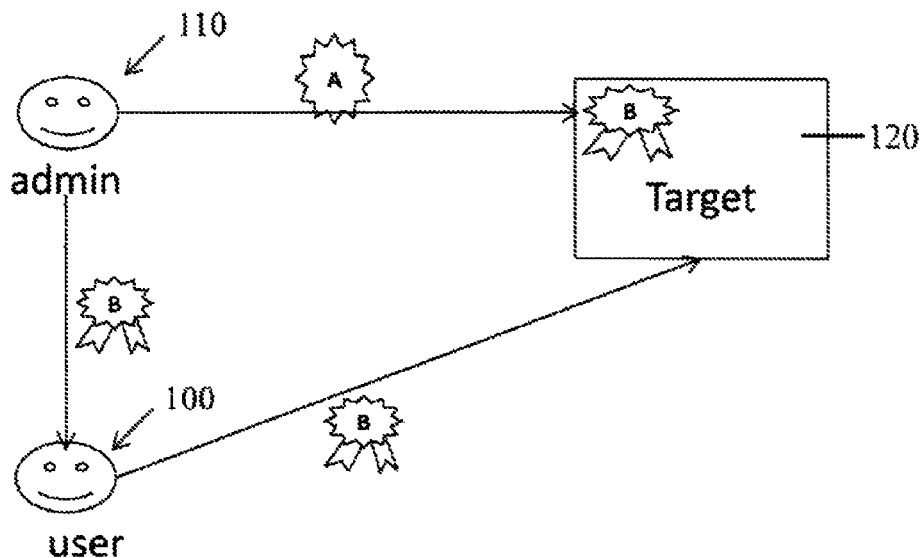
FIG. 1A – Prior art
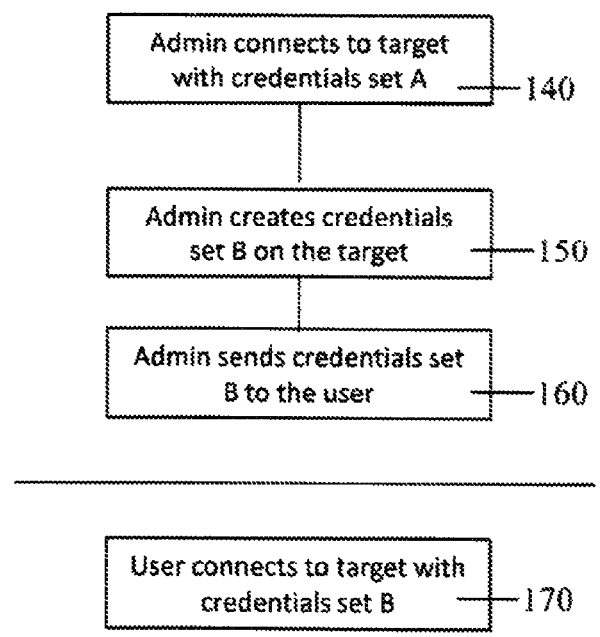
FIG. 1B – Prior art

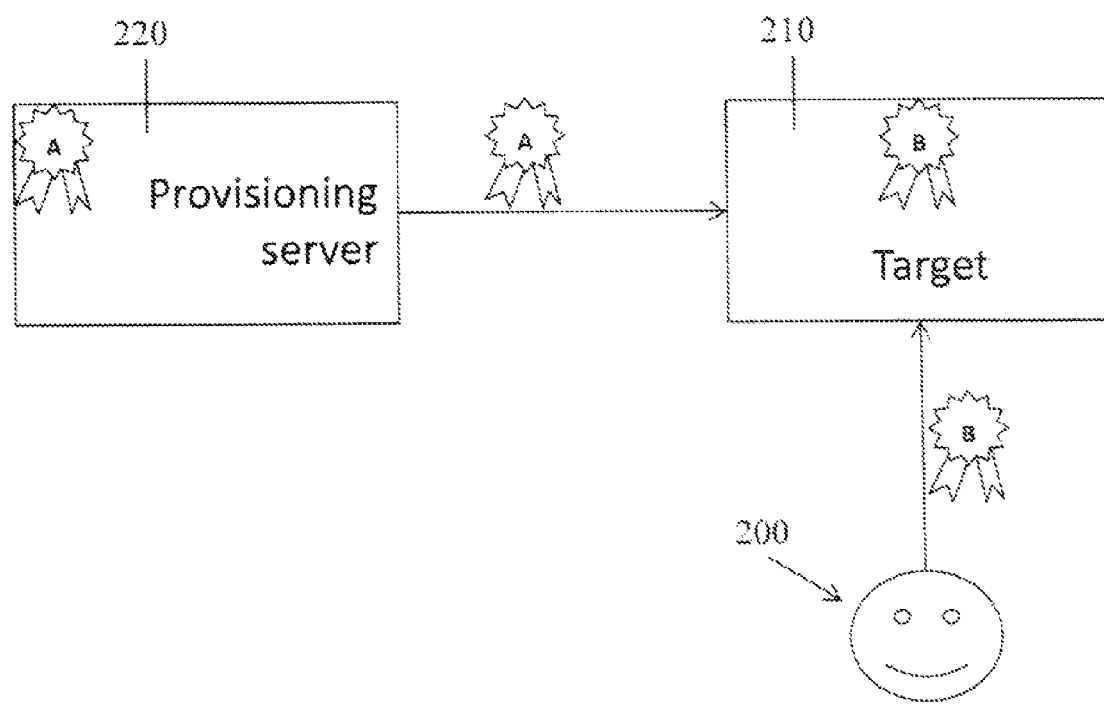
FIG. 2A – Prior art

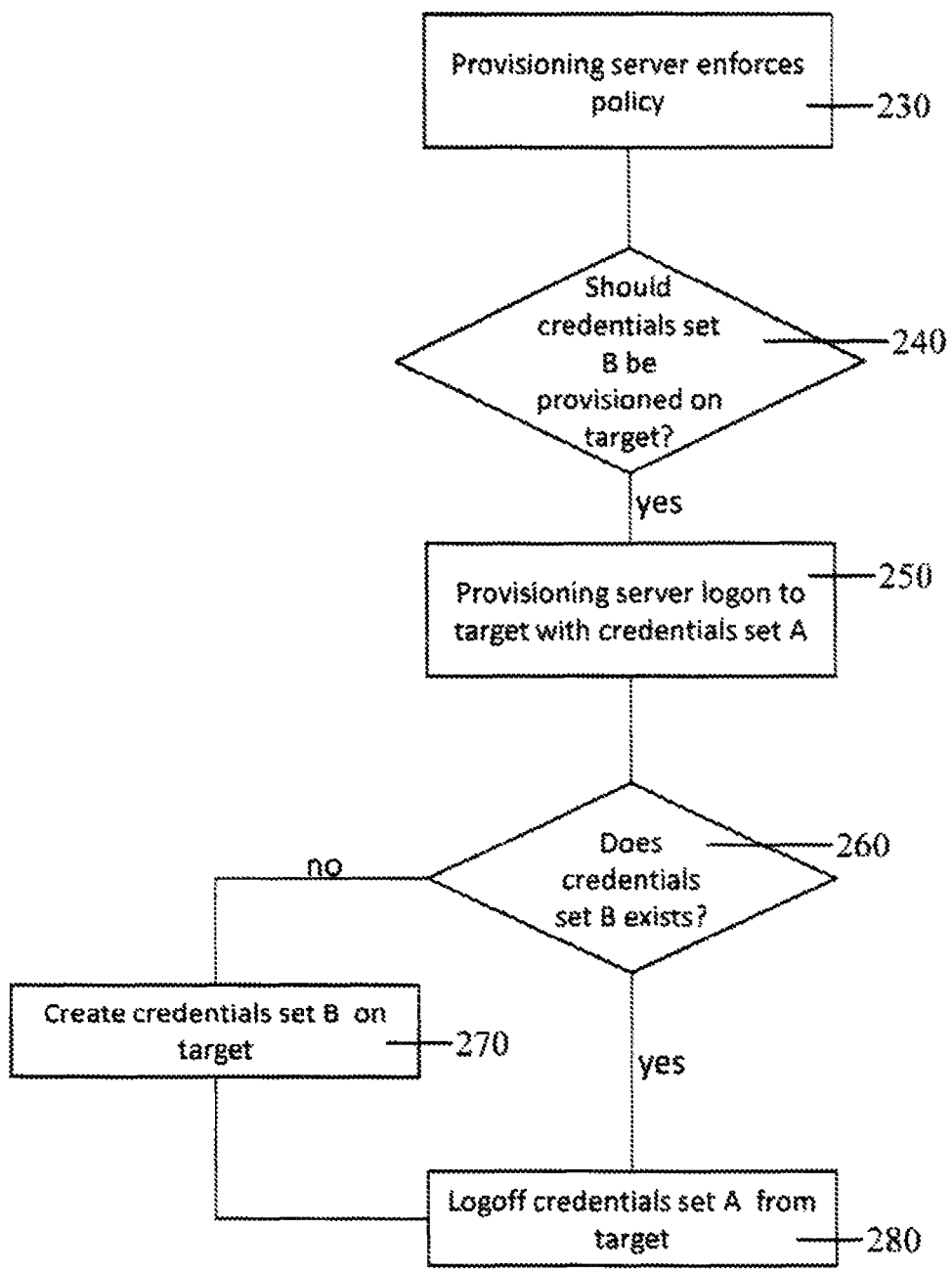
FIG. 2B– Prior art

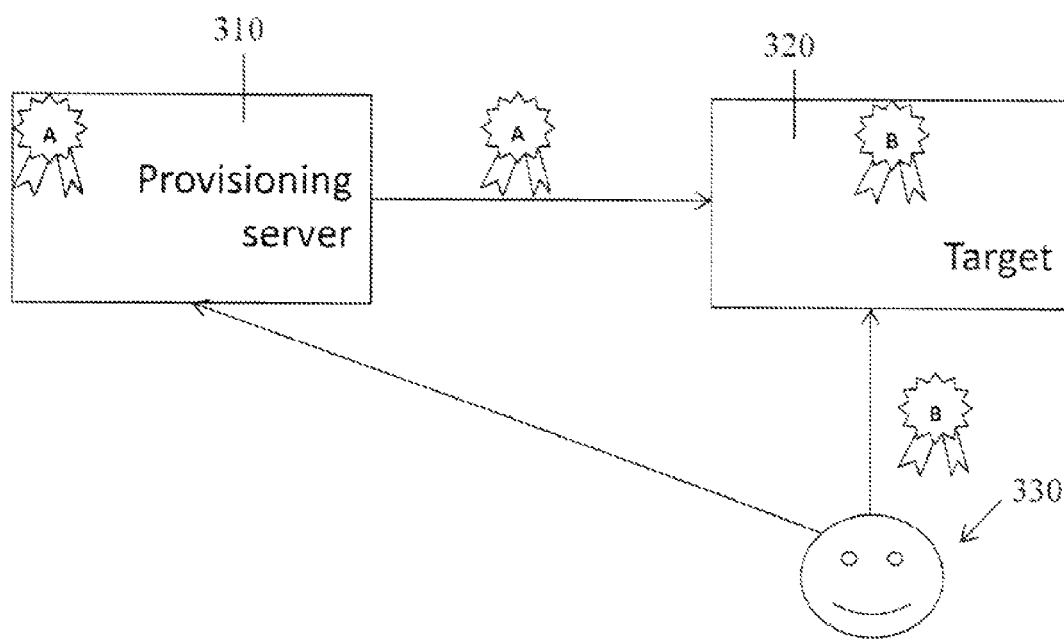
FIG. 3A – Prior art

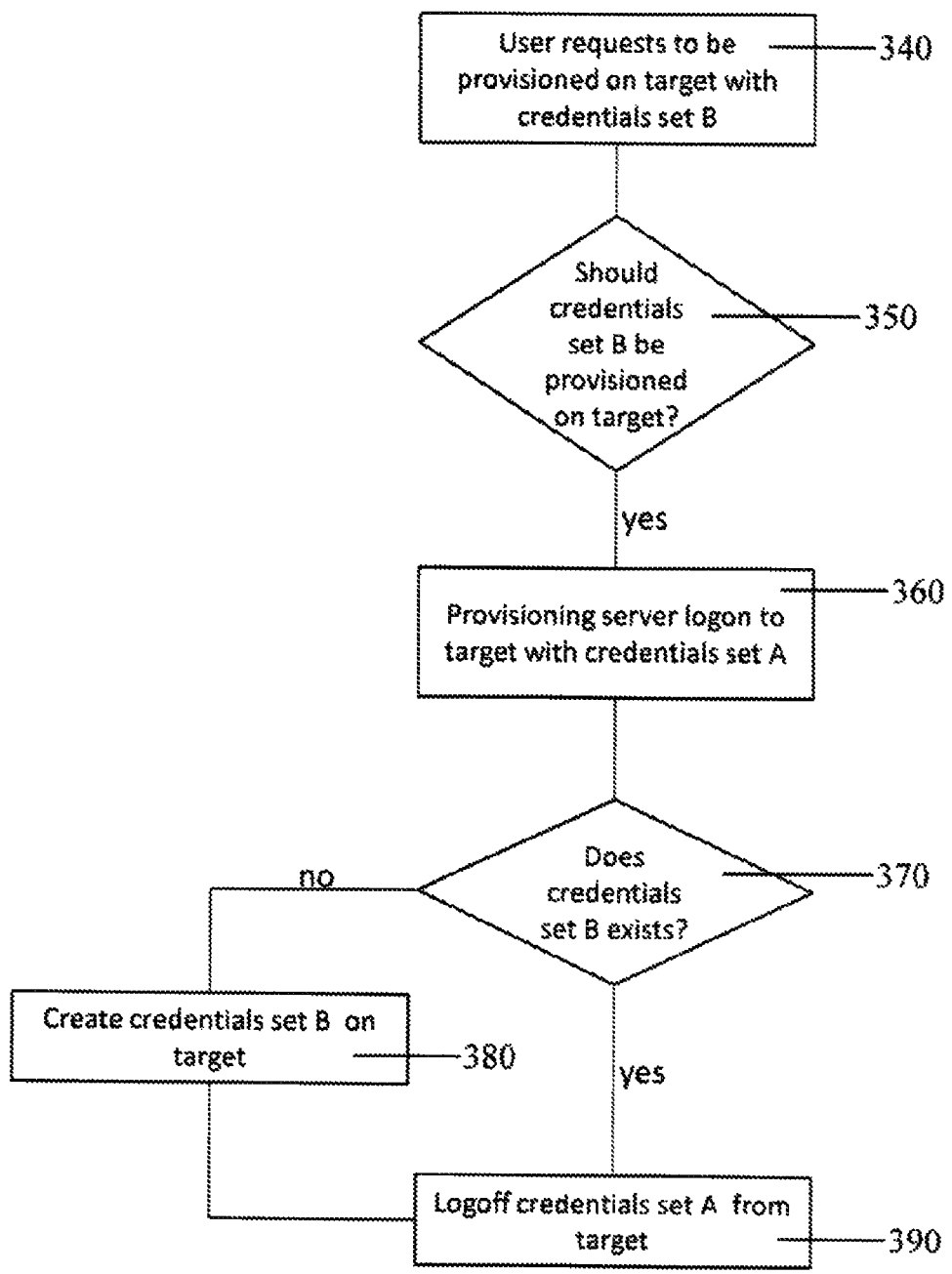
FIG. 3B – Prior art

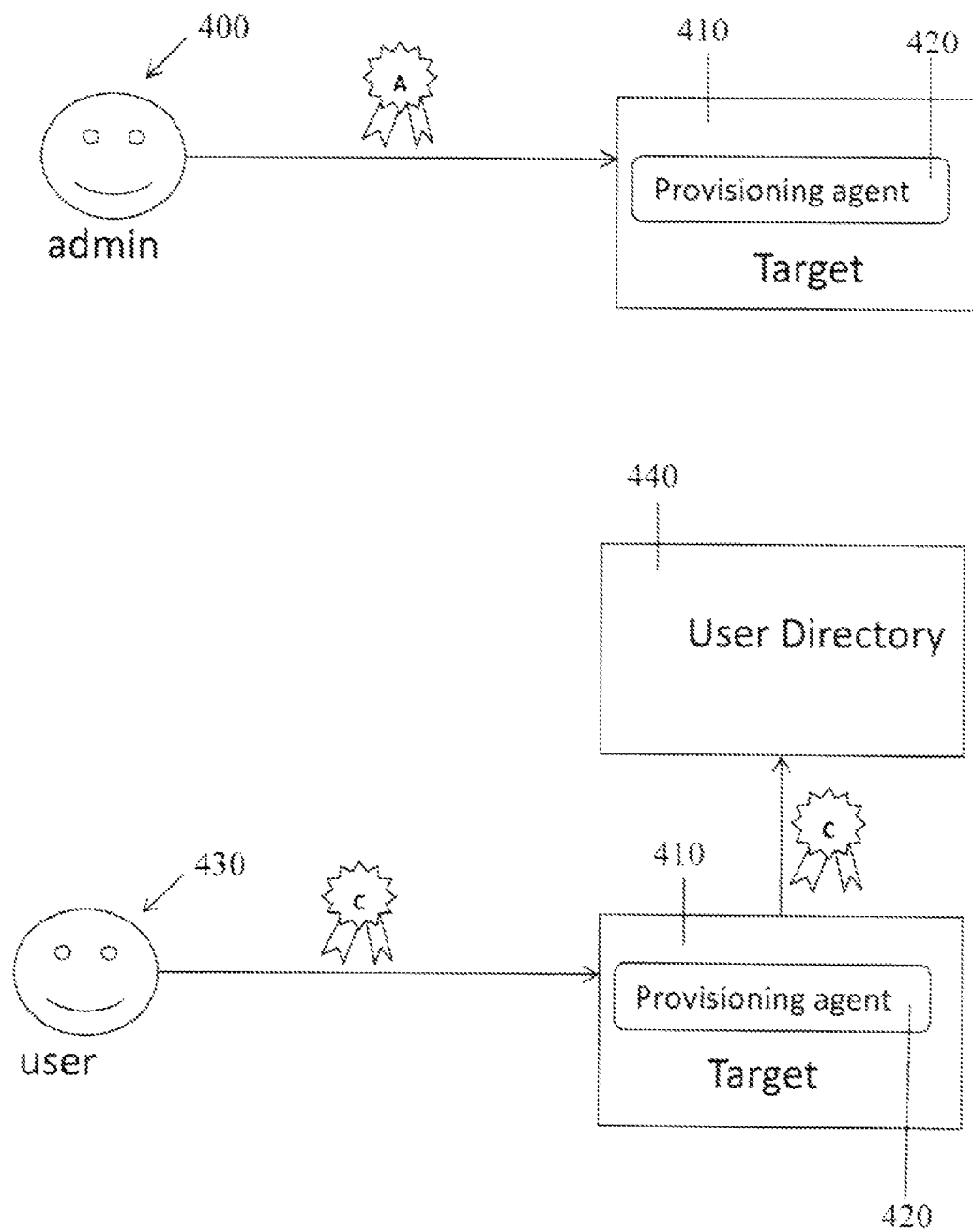
FIG. 4A– Prior art

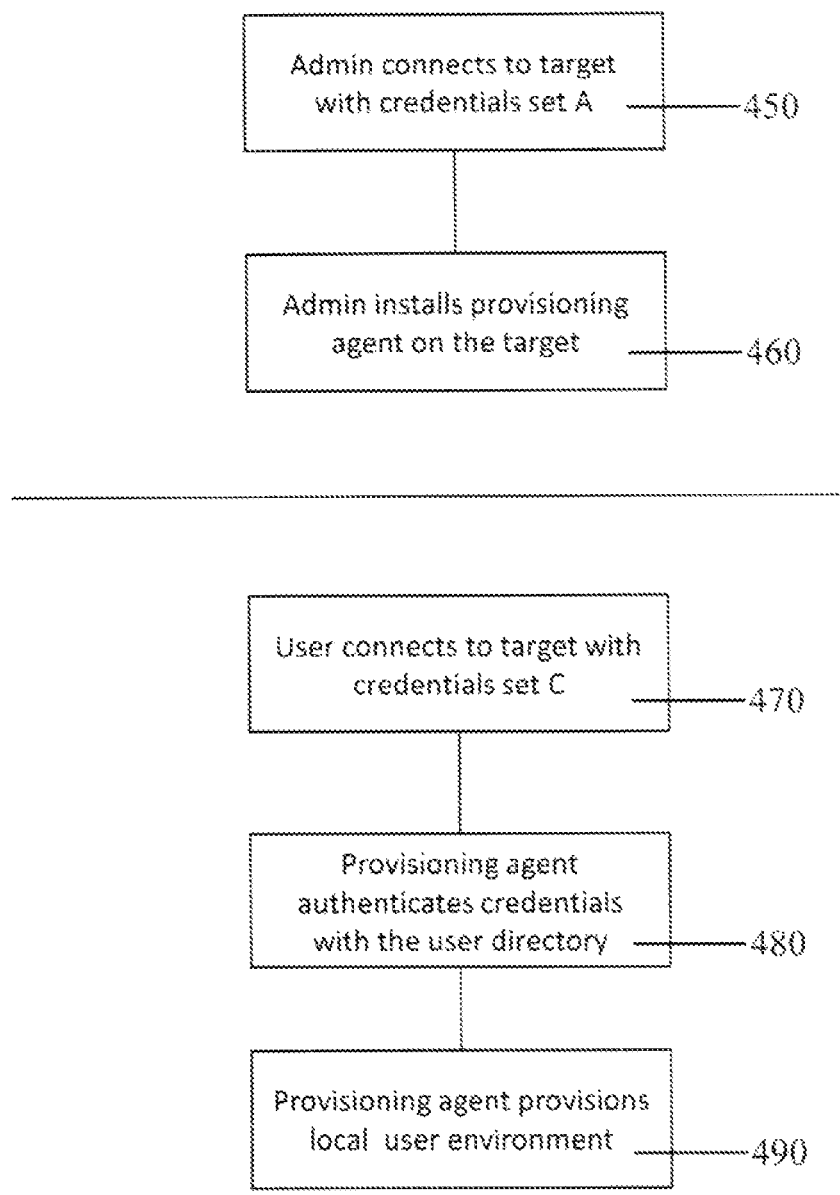
FIG. 4B – Prior art

USER PROVISIONING

RELATED APPLICATION

This application claims the benefit of priority under 35 USC 119(e) of U.S. Provisional Patent Application No. 62/021,234 filed Jul. 7, 2014, the contents of which are incorporated herein by reference in their entirety. This application is also a Continuation-in-Part (CIP) of U.S. patent application Ser. No. 14/372,772 filed on Jul. 17, 2014, which is a National Phase of PCT Patent Application No. PCT/IL2013/050849 having the International Filing Date of Oct. 22, 2013, which claims the benefit of priority under 35 USC 119(e) of U.S. Provisional Patent Application No. 61/717,656 filed on Oct. 24, 2012.

BACKGROUND

The present invention, in some embodiments thereof, relates to user provisioning, and, more specifically, but not exclusively, to provisioning access to a target service.

User provisioning is the process of creating and managing user accounts throughout the join, move and leave phases of the user identity life cycle. Once the user accounts are established, appropriate entitlements and access rights to critical business applications and resources are assigned, maintained and withdrawn. Provisioning tools allow businesses to automate on-boarding and off-boarding of administration workforce processes.

The concept of user provisioning is not new. Information Technology (IT) organizations have provisioned access to IT resources through labor-intensive, error-prone manual processes throughout the history of computing resources. Many organizations still rely on manual processes to set up their user accounts and entitlements. However, more automated user provisioning solutions are available today.

User identities of all types—employees, customers, contractors—require accounts and access rights to support the organization's work. Users may also include applications that require access to other resources in the network. In addition to managing computer system accounts, user provisioning services automate many aspects of resource provisioning, such as equipping users with cellular phones, computer equipment, office space, or nearly any other process that has a programmatic interface. User provisioning can automate these processes, enabling users to access the resources they need on arrival on their first day, as well as providing enterprises with the ability to revoke any access a user may have at the moment his or her relationship with the organization is terminated.

User provisioning workflows automate user provisioning processes and range in complexity. A user provisioning workflow might orchestrate the entire user provisioning process from end to end.

In typical user provisioning systems, a user request must be sent to the system by the user or someone on the user's behalf before he or she attempts to connect to the target service. The user provisioning systems then activate a user provisioning process in a separate thread that usually runs in pre-defined intervals, but can be configured to run instantaneously.

The user is notified that an account has been created on the target service, and the credentials are sent to the user by email or other method.

Multiple implementations for provisioning users with credentials to access target services and other network resources are known in the art. For example, FIGS. 1A and 1B illustrate provisioning user 100 manually on the target service by an administrator 110. The administrator connects to the target service (with credential set A) and creates provisioned credentials (set B) on target service 120 (140 and 150 on FIG. 1B). Credential set B is provided to user 100 (160 on FIG. 1B). The user then connects to the target service with set B (170 on FIG. 1B).

For RDP sessions (Windows OS), an Active Directory/Domain account is automatically provisioned to target services.

FIGS. 2A and 2B illustrate using a provisioning server 220 (e.g. Oracle Identity Manager) to provision a user on a target service 210 according to a policy (230-280 of FIG. 2B). The user then connects to the target service separately.

FIGS. 3A and 3B illustrate using a provisioning server 310 (e.g. Oracle Identity Manager) to provision a user 330 on a target service 320 upon user request (340 of FIG. 3B). After verifying that the user is to be provisioned on the target (350 of FIG. 3B) the credentials are generated (360-390 of FIG. 3B). The provisioning server creates a user account on the target service with credentials that are known to the user (e.g. directory credentials). The user then connects to the target service separately.

FIGS. 4A and 4B illustrate implementing a provisioning agent 420 (such as Active Directory Bridge, e.g. Centrify, BeyondTrust) on the target service 410. An administrator 400 installs provisioning agent 420 on the target service 410 (450-460 of FIG. 4B). Provisioning agent 420 allows the user to connect by taking control of the target service login module (such as Unix/Linux Pluggable authentication module—PAM or/and Name Service Switch—NSS) and has an open protocol to an external system (e.g. Active Directory) for authentication (470-490 of FIG. 4B).

User provisioning should also ensure that only users with the proper level of authorization are able to access and operate target services, such as servers residing in organizational networks. Often, shared accounts are used for this type of access, either due to there not being an account provisioned for the specific user requiring access or due to the user's provisioned account not having the required level of authorization for the desired operation. There are multiple problems with using shared accounts, among them the lack of accountability which arises from the difficulty of attribution, i.e. it is difficult to attribute access or operation performed with a shared account to a specific user or user client.

SUMMARY

According to an aspect of some embodiments of the present invention, there is provided a method of credential provisioning on a target service. The method includes:

i) receiving at an intermediate element, from a user client, a request to establish a session with a specified target service, wherein the request includes authentication credentials;

ii) creating, by the intermediate element using privileged credentials, provisioned credentials for establishing a session with the target service, wherein the privileged credentials are authorized for creating provisioned credentials for accessing the target service; and iii) establishing, by the intermediate element, a dual session communication channel between the user client and the target service, wherein the dual session communication channel includes a first communication session established between the user client and the intermediate element using the authentication credentials, and a second communication session established between the intermediate element and the target service using the provisioned credentials.

According to some embodiments of the invention, establishing the second session includes connecting to the target service with the provisioned credentials.

According to some embodiments of the invention, establishing the second session includes connecting to the target service using the privileged credentials and using the provisioned credentials in a local session on the target service.

According to some embodiments of the invention, the method further includes identifying the target service from at least one of:
  i) an identifier in the request; and
  ii) analysis of the request by the intermediate element.

According to some embodiments of the invention, the user client is an application.

According to some embodiments of the invention, the authentication credentials are null credentials.

According to some embodiments of the invention, the method further includes detecting a termination of the first communication session and, in response to the detecting, withdrawing the provisioned credentials from the target service.

According to some embodiments of the invention, the provisioned credentials are created on the target service.

According to some embodiments of the invention, the provisioned credentials are created on the intermediate element and registered with a user directory accessed by the target service to validate the provisioned credentials.

According to some embodiments of the invention, the provisioned credentials are created on the intermediate element and registered with the target service.

According to some embodiments of the invention, the method further includes determining, in response to the request, the existence or absence of provisioned credentials for the user client for the target service, and:
  i) when the provisioned credentials are absent, creating new provisioned credentials for the user client;
  ii) when the provisioned credentials are present and a specified logic requires new provisioned credentials, creating new provisioned credentials for the user client; and
  iii) when the provisioned credentials are present and a specified logic does not require new provisioned credentials, using the existing provisioned credentials for the user client.

According to some embodiments of the invention, the method further includes determining an authorization to access the target service prior to creating the provisioned credentials, wherein the provisioned credentials are created based on the authorization.

According to some embodiments of the invention, the method further includes monitoring a session established with the provisioned credentials and attributing actions performed during the monitored session to the user client.

According to some embodiments of the invention, the method further includes, at the target service, denying a request to establish a direct session with the user client when the authentication credentials are used.

According to some embodiments of the invention, the method further includes, by the intermediate element, determining a validity of the authentication credentials with at least one of a group which includes:
  i) a privileged account management system (PAMS);
  ii) a user directory;
  iii) a local credential repository; and
  iv) a customized authentication module.

According to some embodiments of the invention, the method further includes, by the intermediate element, retrieving the privileged credentials from a PAMS.

According to some embodiments of the invention, the intermediate element is on one of:
  i) a server functioning as a proxy between the user client and target service;
  ii) a machine on which the user client resides; and
  iii) the target service.

According to an aspect of some embodiments of the present invention there is provided a provisioning system, which includes: a hardware processor, a request management module in electrical communication with the hardware processor, a credential generation module in electrical communication with the hardware processor and the request management module, and a session management module in electrical communication with the hardware processor and the credential generation module. The request management module receives a request from a user client to establish a session with a specified target service, wherein the request includes authentication credentials. The credential generation module creates provisioned credentials for the user client using privileged credentials, wherein the privileged credentials are authorized for provisioning access to the target service. The session management module establishes and terminates a dual session communication channel between the user client and the target service. The dual session communication channel includes a first communication session established between the provisioning system and the user client using the authentication credentials, and a second communication session established between the provisioning system and the target service using the provisioned credentials.

According to some embodiments of the invention, the session management module establishes the second session by one of:
  i) connecting to the target service with the provisioned credentials; and
  ii) connecting to the target service using the privileged credentials and using the provisioned credentials in a local session on the target service.

According to some embodiments of the invention, the request management module identifies the target service from at least one of:
  i) an identifier in the request; and
  ii) analysis of the request.

According to some embodiments of the invention, the provisioning system further includes a network interface for electrical communication with at least one of a user client and a system node running a target service.

According to some embodiments of the invention, the user client is an application.

According to some embodiments of the invention, the credential generation module performs at least one of:
  i) creating the provisioned credentials on the target service during a communication session with the target service established using the privileged credentials;
  ii) registering the provisioned credentials with a user directory accessed by the target service to validate the provisioned credentials; and
  iii) registering the provisioned credentials with the target service.

According to some embodiments of the invention, the credential generation module detects a termination of the first communication session and, in response to the detecting, withdraws the provisioned credentials from the target service.

According to some embodiments of the invention, the provisioning system further includes an attribution module that monitors a session established with the provisioned credentials and attributes actions performed during the monitored session to the user client.

According to some embodiments of the invention, the credential generation module determines a validity of the authentication credentials with at least one of a group which includes:
 i) a privileged account management system (PAMS);
 ii) a user directory;
 iii) a local credential repository; and
 iv) a customized authentication module.

According to some embodiments of the invention, credential generation module retrieves the privileged credentials from a PAMS credential repository.

According to some embodiments of the invention, the provisioning system runs on one of:
 i) a proxy server inline between the user client and the target service;
 ii) a user endpoint running on the user client; and
 iii) the target service.

According to an aspect of some embodiments of the present invention there is provided a computer product for provisioning credentials on a target service. The computer product includes:
 a computer readable storage medium;
 first program instructions to receive, at an intermediate element, a request from a user client to establish a session with a specified target service, wherein the request includes authentication credentials;
 second program instructions to create, by the intermediate element using privileged credentials, provisioned credentials for establishing a session with the target service, wherein the privileged credentials are authorized for creating provisioned credentials for accessing the target service; and
  third program instructions to establish, by the intermediate element, a dual session communication channel between the user client and the target service, wherein the dual session communication channel includes a first communication session established between the user client and the intermediate element using the authentication credentials, and a second communication session established between the intermediate element and the target service using the provisioned credentials;
 wherein the first, second, and third program instructions are stored on the computer readable storage medium.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 1A-B, 2A-B, 3A-B, 4A-B illustrate prior art systems and methods for user provisioning;

DETAILED DESCRIPTION

Figure 5:
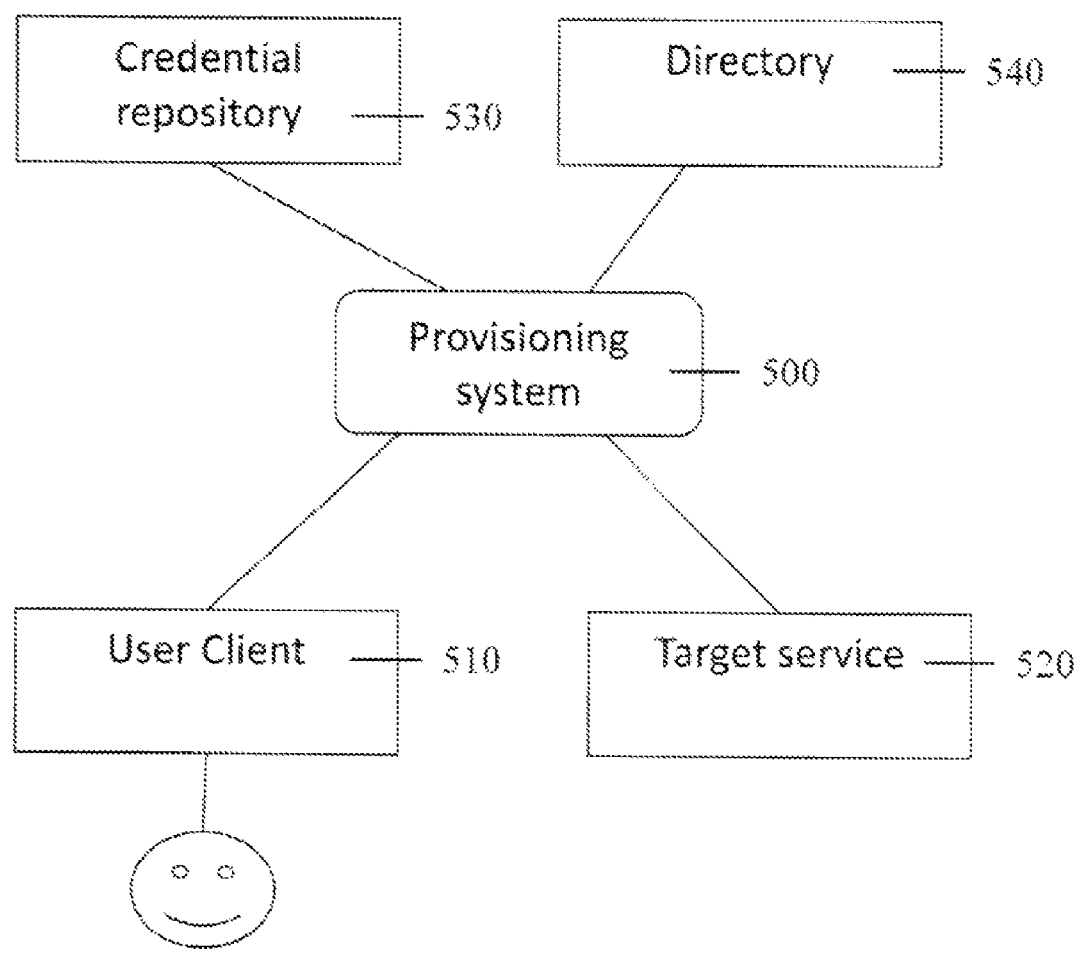
FIG. 5 is a simplified network diagram of a user obtaining access to a target service through a provisioning system, according to embodiments of the invention.

The present invention, in some embodiments thereof, relates to user provisioning, and, more specifically, but not exclusively, to provisioning access to a target service.

Organizations often need to provision user access to system resources. For example, when a new employee is hired, credentials are created on target services such as servers, databases and other applications. The user can access these target services only when in possession of the appropriate credentials.

As used herein the term "user client" means an element which requests access to a target service. Optionally a user client includes a user interface which enables a human user to initiate the request and/or utilize the target service when provisioned credentials are created. Optionally, a user client is an application which requests access to a target service independently (without receiving a request from a human user).

As used herein the term "user" means the entity which provides the authentication credentials, and includes human users (who enters the authentication credentials into a user client) and an application which provides the authentication credentials without human input (in which case the application is both the user and the user client).

In this description, the term "credential set" means any type of information that may be used for authentication. A credential set may include one or more of: an account name and password, SSH keys, certificates, biometric information, access tokens, one-time passwords and any other type of credentials which may be used for accessing system resources and/or accessing services and/or for authentication.

Embodiments described herein use three credential sets in order to enable a user client to access a given target service or services, without providing the user client with credentials to access the target service directly.

1) Authentication credentials are held by the user, but do not enable the user and/or user client to access the target service directly. In order to access the target service the user client requests access to the target service from an intermediate element such as a provisioning system. The request includes the authentication credentials, which are optionally used to authenticate the user, making it possible to determine whether the user is authorized to access the target service (i.e. user authorization). Optionally, the authentication credentials are null credentials, for example when there is no need to identify or authenticate the user accessing the target service.

2) Provisioned credentials are created to enable the intermediate element to establish a session with the target service. The provisioned credentials are not provided to the user client. Optionally, the provisioned credentials are registered with the target service, so that the target service is able to use the provisioned credentials for conducting communication session(s). Optionally, provisioned credentials are created for a specific user session, meaning that for different provisioned credentials may be used for different user sessions, even when the same authentication credentials are used. Optionally, provisioned credentials include an account on the target service and a respective password.

3) Privileged credentials are required in order to create provisioned credentials.

Optionally, before the provisioned credentials are created it is first determined whether the user client is authorized to establish a session with the requested target service. Provisioned credentials are created only for authorized user clients.

Optionally provisioned credentials are created as follows:

1) Credentials including the required fields are generated (e.g. by creating strings, binary data and/or other credential data). The generated credentials may include an account name and a password, although other types of credentials are possible (such as SSH keys, certificates and others). Optionally the credential data is stored in a repository (e.g. local storage on the intermediate element, PAMS, target service or other locations).

2) After generation, the privileged credentials are used to connect to a system on which the provisioned credentials are to be registered. The system may be the target service or a different system/service which the target service is able to access to retrieve and/or authenticate credentials.

3) The provisioned credentials are registered with the target service or other system/service. After the provisioned credentials are registered, the target service is able use them for establishing and maintaining sessions and, optionally, for authentication. Credential registration may be performed, for example, by executing a command or following a workflow (according to the target service capabilities), so as to create and properly register the provisioned credentials so that the target service can use them for authentication.

Optionally, registration includes setting an authorization (also denoted user entitlement) for the provisioned credentials on the target service. The user authorization defines which resources the user client may access with the provisioned credentials (such as establishing a session with a target service and/or specific actions which may or may not be performed during the target session). Optionally, the authorization of the provisioned credentials is different from the authorization of the privileged credentials. Optionally the use of provisioned credentials enables association of sessions, access and operation on the target service with a specific user or user client. Provisioning users on demand provides accountability by enabling attribution of access and operations to the specific user or user client for which the provisioned credentials on the target service were created.

In some cases the user may have shared credentials which are not attributed to a specific user or user client. Optionally, the authorization of the provisioned credentials is different from the authorization of the shared credentials.

Optionally provisioned credentials are created and registered by at least one of the following:

1) The provisioned credentials (e.g. strings, binary data and/or other credential data) are generated on the intermediate element. The privileged credentials are used to connect to the target service. The provisioned credentials are registered with the target service;

2) The provisioned credentials are generated on the intermediate element. The privileged credentials are used to connect to a user directory and/or directory service which is used as a directory by the target service. The provisioned credentials are registered with the user directory and/or directory service; and 3) The privileged credentials are used to connect to the target service. The provisioned credentials are generated on the target service (e.g. by storing credential data, such as username and password strings, on the target service). Optionally, the provisioned credentials are registered with a user directory and/or directory service which is used as a directory by the target service. Reference is now made to FIG. 5 which is a simplified network diagram of a user client obtaining access to a target service through a provisioning system, according to embodiments of the invention. Provisioning system 500 acts as an intermediate element between user client 510 and target service 520. The user client is provided with authentication credentials which do not allow the user to access (e.g. establish a session with) the target service 520 directly, but do allow access to provisioning system 500. Provisioning system 500 has (and/or has access to) privileged credentials which allow it to create provisioned credentials which enable access to the target service or system. Using the privileged credentials, provisioning system 500 creates provisioned credentials which may be used to establish a session on the target service. Provisioned credentials may be created "on-demand", when the user client requests access to the target service.

As used herein the term "intermediate element" means a system element along the communication channel between the user client and target service, which accesses the target service for the user client using the provisioned credentials without making the provisioned credentials available to the user client.

Provisioning system 500 may be located on any element which enables it to serve as an intermediate between the user client and the target service. In some embodiments, provisioning system is located on a proxy server between the user client and the target service (e.g. the embodiment of FIG. 7). In alternate or additional embodiments, provisioning system 500 runs on an endpoint on which the user client is installed and/or is integrated into the user client (e.g. the embodiment of FIG. 17). In alternate or additional embodiments, provisioning system 500 runs on an endpoint or server on which the target service is installed and/or is integrated into the target service (e.g. the embodiment of FIG. 21). Optionally, provisioning system 500 is distributed over multiple endpoints and/or user clients and/or servers in a network.

Provisioning system 500 establishes a dual session communication channel between user client 510 and the target service 520. The authentication credentials are used to establish the first session between the user client and provisioning system 500. The provisioned credentials are used to establish the second session between provisioning system 500 and the target service 520. The provisioning element invokes a 'shadow' session on the target service, so that the user client is able to establish a session with the target service without being in possession of credentials which allow direct access to the target service. Provisioned credential creation may be performed transparently to the user client.

In some embodiments the first session is established when the user client initially accesses provisioning system 500. Therefore there is no need to establish a new first session after the credentials are provisioned.

Optionally, before creating the privileged credentials, provisioning system 500 checks if valid provisioned credentials already exist. In this case there is no need to create a second set of provisioned credentials, and the provisioning system 500 uses the existing credentials to establish the second session.

Optionally, provisioning system 500 creates new provisioned credentials for a specific session with the target service, regardless of whether valid provisioned credentials already exist.

Provisioning system 500 may serve as a control point to maximize security. Optionally, provisioning system 500 obtains the privileged credentials from a credential repository 530, which manages access to privileged credentials for security purposes.

Optionally, provisioning system 500 accesses an account management system (e.g. PAMS) in order to perform one or more of:
 i) Authenticate users and/or user clients;
 ii) Manage authentication credentials; and
 iii) Obtain privileged credentials.

The Privileged Account Management System (PAMS) includes a system which manages privileged accounts, access and actions in accordance with organizational policy, mainly by controlling and managing the credentials to privileged accounts (i.e. privileged credentials). Some features of PAMS include user authentication, mapping of which users are allowed usage of which privileged account and logging of privileged accounts usage. Additional features include monitoring of actions performed by privileged users. Additional features include support of various workflows, for example managerial approval for password retrieval, correlation with ticketing systems, one-time passwords and password replacement. These aspects of PAMS support organizational policies and procedures for network security and access control.

Optionally, provisioning system 500 has access to a user directory which holds user accounts. The user account stores the respective authentication and/or provisioned credentials and may also define which resources the respective user is entitled to use, so that provisioning system 500 may issue provisioned credentials only to entitled users. A user account may be created for any type of user, including human users and/or applications and/or groups of users.

The session between the provisioning system and the target service is a separate session than the session opened by user client to the provisioning system. This may provide the security benefit of preventing malware that found its way to the user endpoint from propagating to the target service. Employing the provisioning system may also protect against a privileged credentials theft (e.g. by malwares and keyloggers) which can potentially infect the client machines.

As used herein the term "communication channel" means a form or suitable combination of forms of communication between a user client and a target service.

Optionally, forms of communication performed over a communication channel include one or more of:
 1) Communication over a communication network;
 2) Internal communication within a user endpoint and/or computer and/or server (e.g. inter-memory communication between processes); and
 3) Communication between machines running on the same server (such as virtual machines on the same physical server).

Optionally the session between the user client and the provisioning system uses a different form of communication channel than the session between the provisioning system and the target service. For example, consider a case where the provisioning system is integrated into the user client on a user endpoint and the target service runs on a remote server. The session between the user client and the provisioning system is internal within the user endpoint and the session between the provisioning system and the target service is over a communication network.

As used herein the term "target service" means a resource which is on the receiving end of provisioning changes, and which is accessible via a user client on a user endpoint (such as a terminal or personal computer). The term "target service" includes applications, systems, servers and other machines, which may reside on an endpoint or be accessible over a communication network. The term "target services" is intended to encompass resources which are on-premise (e.g. within an organizational network), on a local server, on a remote server, in the Cloud or on other types of system node.

As used herein the term "authentication credentials" means a set of credentials which are used to request access to a target service, and, optionally, to authenticate to the provisioning system. The authentication credentials do not enable direct access to the target service.

As used herein the term "privileged credentials" means a set of credentials which is authorized (i.e. able) to create a set of provisioned credentials on a target service.

As used herein the term "provisioned credentials" means a set of credentials which are used by an intermediate element (i.e. provisioning system) to access the target service in order to create a communication channel between the user client and the target service.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Provisioning Method

Figure 6A:
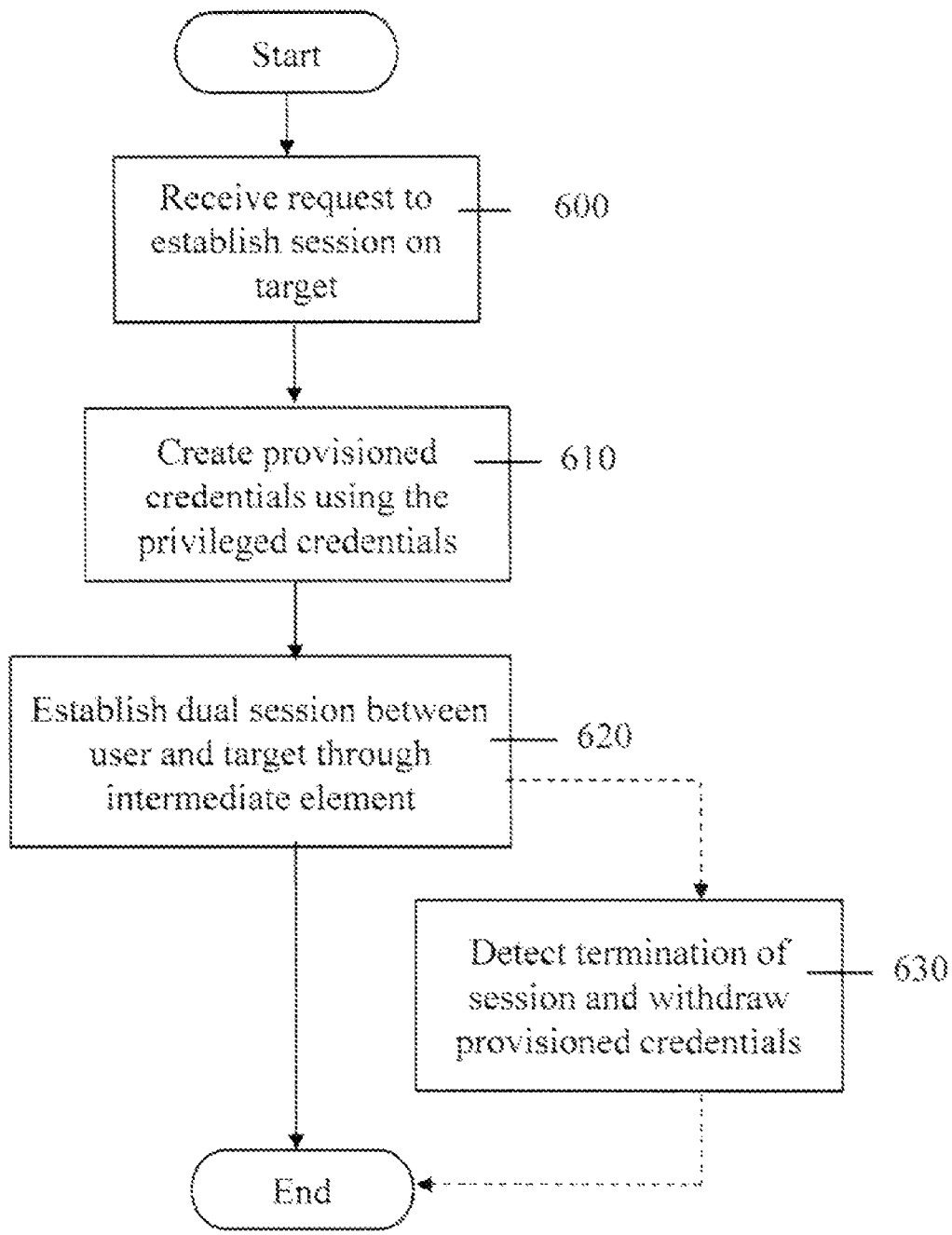
FIG. 6A is a simplified flowchart of a method of credential provisioning on a target service, according to embodiments of the present invention.

Reference is now made to FIG. 6A, which is a simplified flowchart of a method of credential provisioning on a target service, according to embodiments of the present invention.

In 600, a request from the user client to establish a session with a target service is received at an intermediate element. The target service may be located on any system node accessible to the user client, either on the user client endpoint or through a communication network (e.g. on a server connected to the communication network or via a proxy server on the communication network).

The request includes authentication credentials. The authentication credentials may be provided to the user client by any means known in the art (e.g. by a system administrator, by a user, by another system element, etc.). The authentication credentials give the user client access to the provisioning system but not to the requested target service directly.

Optionally, the intermediate element determines that the authentication credentials are valid with at least one of:
  i) A PAMS;
  ii) A user directory;
  iii) A local credential repository;
  iv) A customized authentication module in the intermediate element.

Determining the validity of authentication credentials may be performed by any authentication technique known in the art. Such authentication techniques may include, but are not limited to, embedding a third party authentication module or customized authentication module. Optionally, such authentication modules may include biometrics-based authentication modules, smartcard-based authentication modules, password-based authentication modules, certificate-based authentication modules and others.

Optionally, the target service is identified from the request by at least one of:
  i) An identifier in the request; and
  ii) Analysis of the content and parameters of the request.
Optional embodiments of analyzing the request include:
  i) The target service is determined from the originating address of the request. For example, requests from a specific machine address or range of addresses are considered requests to establish a session with target service X.
  ii) The target service is determined from the authentication credentials. For example, requests which include particular authentication credentials are considered requests to establish a session with target service Y.
  iii) The target service is determined from a combination of the originating address and the authentication credentials. For example, for the same authentication credentials, a request received from originating address OA1 is considered a request to establish a session with target service Z1, whereas a request received from originating address OA2 is considered a request to establish a session with target service Z2.

Optionally, the authentication credentials are used by the provisioning system to achieve one or more of:
  1) Listing (or other description) of user authorization to establish a session with the target service (and possibly other system resources);
  2) Authentication of the user (e.g. by a privileged account management system or other authentication mechanism); and
  3) Access to a user directory which lists or otherwise describes the user entitlements.

In 610, provisioned credentials are created using privileged credentials which are authorized for creating provisioned credentials. Optionally, the provisioned credentials are based on the user entitlements which are optionally determined from the authentication credentials.

The privileged credentials may be obtained in any manner known in the art, including one or both of:
  1) Manually entered by a system administrator or other authorized person;
  2) Automatically uploaded by another system; and
  3) Electronically obtained from a credential repository, such as PAMS. Optionally retrieval is permitted only after the user has been authenticated by any authentication means known in the art, such as a privileged account management system (PAMS).

Optionally, user authorization to access a target service is determined before the provisioned credentials are created.

Optionally, the method further includes determining if the provisioned credentials are already present. If not, new provisioned credentials are created in response to the request. Optionally, when provisioned credentials are present additional logic is applied to determine whether the present provisioned credentials should be used or if new provisioned credentials should be created. For example, new provisioned credentials may be created for a particular session.

Optionally, the method further includes creating provisioned credentials on the target service. Optionally, provisioned credentials are created on the target service during a session established with the target service using the privileged credentials. Alternately or additionally, the provisioned credentials are generated externally to the target service and provided to the target service.

Optionally, creating provisioned credentials includes:
  i) Generating provisioned credentials on every request to access the target service;
  ii) Storing provisioned credentials for the respective user in a user directory connected to the communication network; and
  iii) Retrieving provisioned credentials from the user directory in response to the user client request to access the target service.

In 620, a dual session communication channel is established between the user client and the target service. The first session is between the user client and an intermediate element and the second session is between the intermediate element and the target service. The intermediate element uses the provisioned credentials to establish the second session with the target service.

Optionally, the dual session is created by connecting the user client to the second session between the intermediate element and the target service.

Optionally, the communication session between the user client and the intermediate element is established using the authentication credentials, and the communication session between the intermediate element and the target service is established using the provisioned credentials.

Optionally, the session between the intermediate element and the target service is established with the privileged credentials, and then a local context switch is performed on the target service to change the session to the provisioned credentials. After the provisioned credentials are created on the target service, the intermediate element does not log off of the existing session (which was used to create the provisioned credentials). Instead, the intermediate element changes the existing session from a privileged session, which was established with the privileged credentials, to a session established with the provisioned credentials. This session change optionally ensures that operations performed in the session after the change to provisioned credentials are performed with the authorization defined by the provisioned credentials and not that of the privileged credentials. For example, if the target service is a UNIX machine, changing the existing session may be done by the "su" command executed on the target service.

Optionally, the intermediate element is installed on one of:
  i) a server functioning as a proxy between the user client and target service;
  ii) A machine (physical or virtual) on which the user client resides, which includes an operating system capable of executing applications and commands; and
  iii) The target service.

Optionally, in 630, the method further includes detecting when the communication session is terminated, and, in response, withdrawing the provisioned credentials. Withdrawing is optionally performed by one or more of:
  i) Deleting the provisioned credentials from the target service;
  ii) Disabling the provisioned credentials on the target service; and
  iii) Changing the operation and/or access permissions of the provisioned credentials on the target service.

Optionally, the termination is initiated by one of:
  A) The user client;
  B) The target service; and
  C) The intermediate element.

Optionally, provisioned credentials are withdrawn when communication between the user client and the target service over the communication network are disrupted.

Optionally, proper usage of the various credentials (i.e. privileged, provisioned and authentication) is enforced by the target service (or target server). Optionally the target service (or server) performs one or both of:
  i) Denying a request to establish a direct session between the user client and the target service (i.e. not through the provisioning system) when the authentication credentials are used; and
  ii) Validating the provisioned credentials with the user directory.

Optionally, once the user client accesses the target service, the dual session is monitored (e.g. recorded in video and text format). Actions performed during the session may be attributed to the user client which requested the session.

Additionally or alternately, another party, such as an auditor, may watch the session in real time and, optionally, decide when the session should be terminated based on a policy breach or other (possibly) invalid activity.

Provisioning System

Figure 6B:
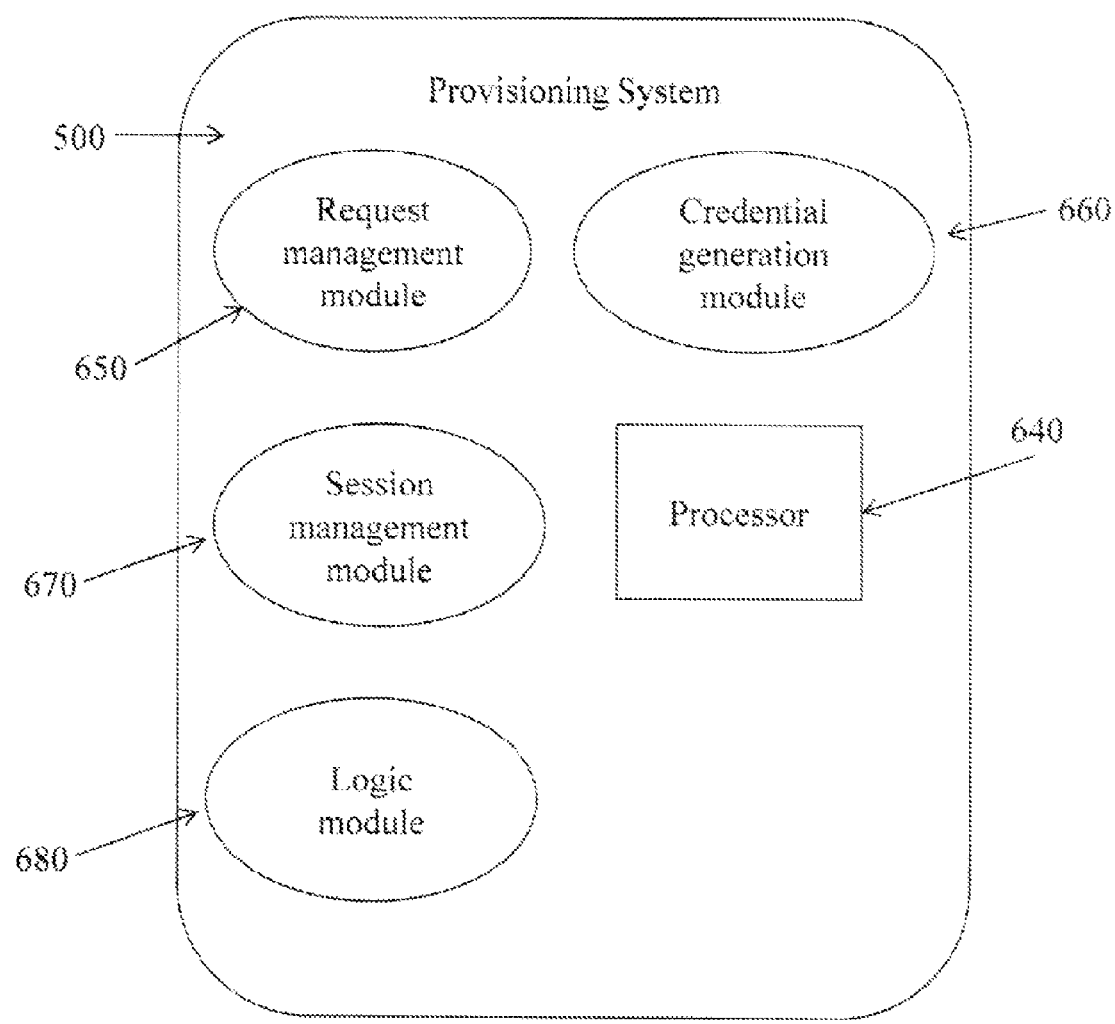
FIG. 6B is a simplified block diagram of a provisioning system, according to embodiments of the invention.

Reference is now made to FIG. 6B, which is a simplified block diagram of a provisioning system, according to embodiments of the invention. Provisioning system 500 uses provisioned credentials to enable the user client access to the target service, by retrieving existing provisioned credentials or creating new provisioned credentials.

Optionally, provisioning system 500 runs on a proxy server which is inline between the user client and the target service, and prevents access to the provisioned credentials by the user client. The first session communicates over communication network between the user endpoint and the proxy server, and the second session is between the provisioning system and the target service. Optionally, the target service runs on the proxy server, in which case the second session occurs internally in the proxy server.

Optionally, provisioning system 500 runs on a user endpoint on which the user client also runs, and the first session occurs internally in the endpoint hosting the user client. The provisioning system does not divulge the provisioned credentials to the user client (and the user is not required to provide the provisioned credentials).

Optionally, provisioning system 500 is integrated into the target service or runs on the endpoint (e.g. server) hosting the target service. In this case the second session occurs internally to the endpoint hosting the target service. The provisioning system does not divulge the provisioned credentials to the user client (and the user is not required to provide the provisioned credentials).

It is noted that multiple provisioning systems may run on different network nodes. For example, some user clients may obtain access to target services through a provisioning system running on the endpoint, whereas other user clients may obtain access to target services over a communication network from a provisioning system on a proxy server or other network node.

Provisioning system 500 includes:
  i) Hardware processor 640;
  ii) Request management module 650;
  iii) Credential generation module 660; and
  iv) Session management module 670.

Optionally, provisioning system 500 includes a network interface (not shown) for electrical communication over a communication network with a user client and/or a system node running a target service.

Request management module 650, receives user client requests to establish a session with the target service. The request includes authentication credentials.

Credential generation module 660, uses the privileged credentials to obtain or create the provisioned credentials. Optionally, the privileged credentials are stored in a memory within or accessible to provisioning system 500.

Optionally, generation module 660 determines user entitlements from the authentication credentials. Based on the determined user entitlements, provisioned credentials are created using privileged credentials.

Optionally, credential generation module 660 obtains the privileged credentials from a credential repository. Optionally, the user is authenticated to the credential repository before the privileged credentials are provided by the credential repository. The credential repository may be internal or external to the provisioning system and/or server or machine running provisioning system 500. For example credential repository 530 may be incorporated in a PAMS.

Optionally, credential generation module 660 is configured to create the provisioned credentials on the target service. Provisioned credentials may be created on the target service during a communication session between provisioning system 500 and the target service, where the communication session is established using the privileged credentials.

Optionally, credential generation module 660 detects when the session between the user client and the target service is terminated, and, in response withdraws the provisioned credentials from the target service (e.g. as described above).

Optionally, credential generation module 660 creates random provisioned credentials.

Optionally, credential generation module 660 creates a user account on a user directory. The account includes the provisioned credentials and may include other information, such as information used to authenticate a respective user. Provisioned credentials may then be extracted by credential generation module 660 from the user account when needed.

Optionally, the user directory is accessible by the target service and validates provisioned credentials to the target service.

Session management module 670 establishes and terminates the dual session communication channel between the user client and the target service. Optionally, session management module 670 establishes the first communication session using the authentication credentials and the second communication session using the provisioned credentials.

Optionally, provisioning system 500 further includes logic module 680 which performs logic functions. In some embodiments, prior to creating provisioned credentials, credential generation module 660 determines if provisioned credentials which enable the user client to access the requested target service are already present. If there are no provisioned credentials, credential generation module 660 creates new provisioned credentials. When provisioned credentials are already present, logic module 680 applies specified logic to determine whether the present provisioned credentials should be used or if new provisioned credentials should be created. Logic module 680 then instructs credential generation module 660 whether new provisioned credentials should be created in response to the request.

Provisioning System on Proxy Server

In the following description, set #1 are privileged credentials, set #2 are provisioned credentials, and set #3 are authentication credentials.

In the embodiments of FIGS. 7-16B the provisioning system is located on a proxy server, and the proxy server is the user client's access point to the target service.

In some embodiments, the user uses an application (e.g. Putty, Microsoft RDP, Web Browser) to connect to the target service through the proxy server. The provisioning system on the proxy server may open a session (e.g. RDP/SSH/Web) with the target service even though the authentication credentials supplied by the user are not on the target service.

Optionally, the user is authenticated to the provisioning system by any authentication method known in the art (e.g. using Active Directory credentials). Only after the provisioning system authenticates the user does the provisioning system open a session from the proxy server to the target service using privileged credentials (set #1).

Optionally, the provisioning system does not use any kind of element or software installed on the target service. Optionally, there is no communication (e.g. AD protocol) from the target service to the user directory. This is an advantage as an organization does not need to open network access on each target service to the user directory. After the provisioned credentials have been provisioned on the target service, the user is still unable to log on to the target service with any other remote application as he or she was never exposed to the provisioned credentials (set #2).

Optionally, the privileged credentials (which may include one or more of: username/password or SSH key for e.g. domain admin, administrator, and root accounts) are stored securely and tamper-proof (e.g. encrypted) on the proxy server itself. Optionally, the privileged credentials are stored securely and tamper-proof on a PAMS.

Optional protocols for the communication session(s) include one or more of:
1) SSH protocol to Unix/Linux/Network devices hosting target services;
2) Microsoft RDP to Windows systems;
3) PL/SQL protocol to database target services like Oracle, MSSQL, DB2, mySql, etc.;
4) Web Services protocols for target services that support web services APIs like REST, SOAP, XML, etc.;
5) Web pages protocol for target service;
6) Application GUIs; and
7) Application APIs.

In an exemplary embodiment, the communication protocol is a Web pages protocol, and the provisioning system provisions the provisioned credentials by automatically filling in fields in web forms and other HTML elements.

In an exemplary embodiment, the communication protocol is application GUI, and the provisioning system provisions the provisioned credentials by automatically filling in fields in forms and application elements.

Optionally, the provisioning system securely obtains privileged credentials (set #1) and opens a session to the target service. While the session is being established, the provisioning system uses the privileged credentials (set #1) to create provisioned credentials on the target service. The provisioning system creates provisioned credentials (set #2) and initiates the session.

FIGS. 7-16B are simplified system diagrams and flowcharts illustrating credential provisioning with a provisioning system on a proxy server, according to embodiments of the invention. Optionally, aspects of the embodiments are combined (for example to include both a user directory and credential repository).

Figure 7:
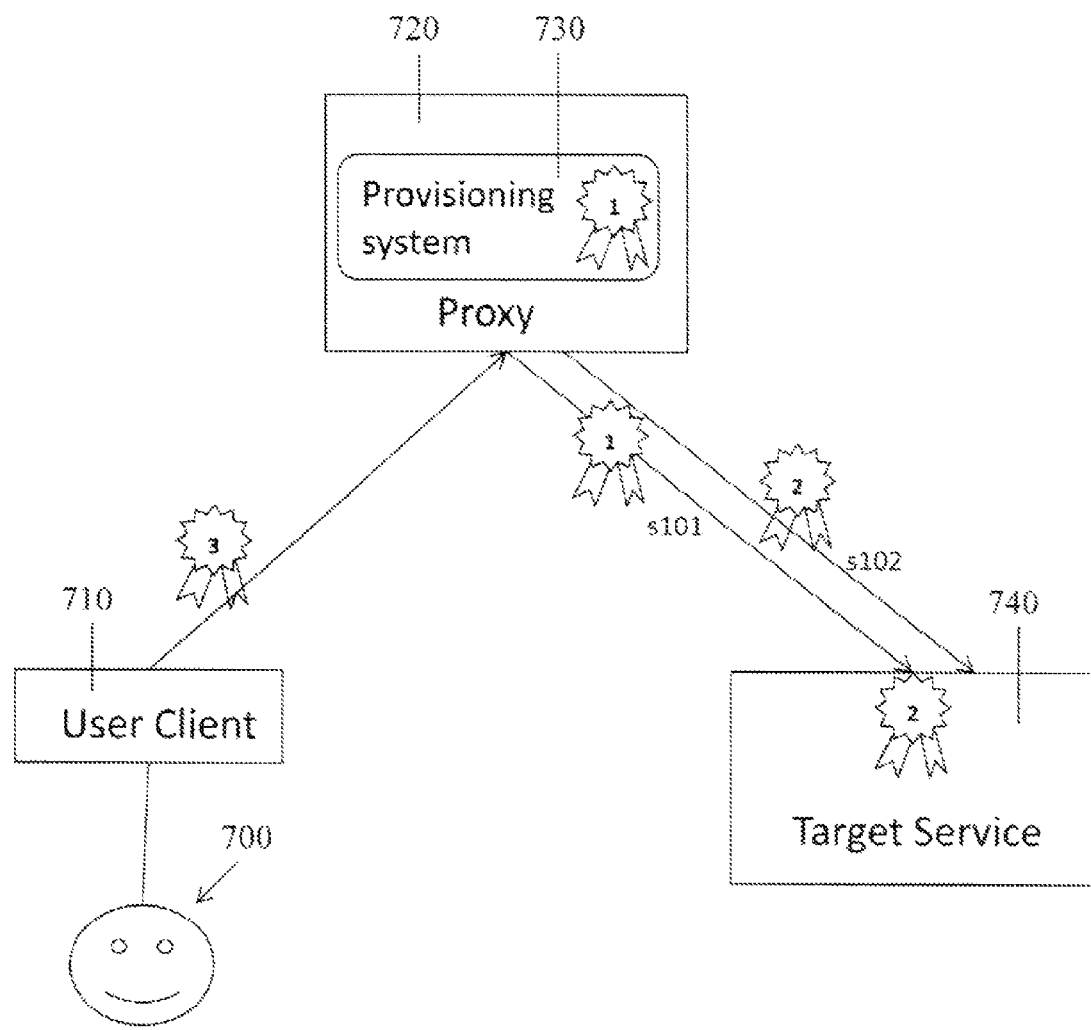
FIG. 7 is a simplified system diagram illustrating credential management by a provisioning system located on a proxy server, according to embodiments of the invention.
Figure 8:
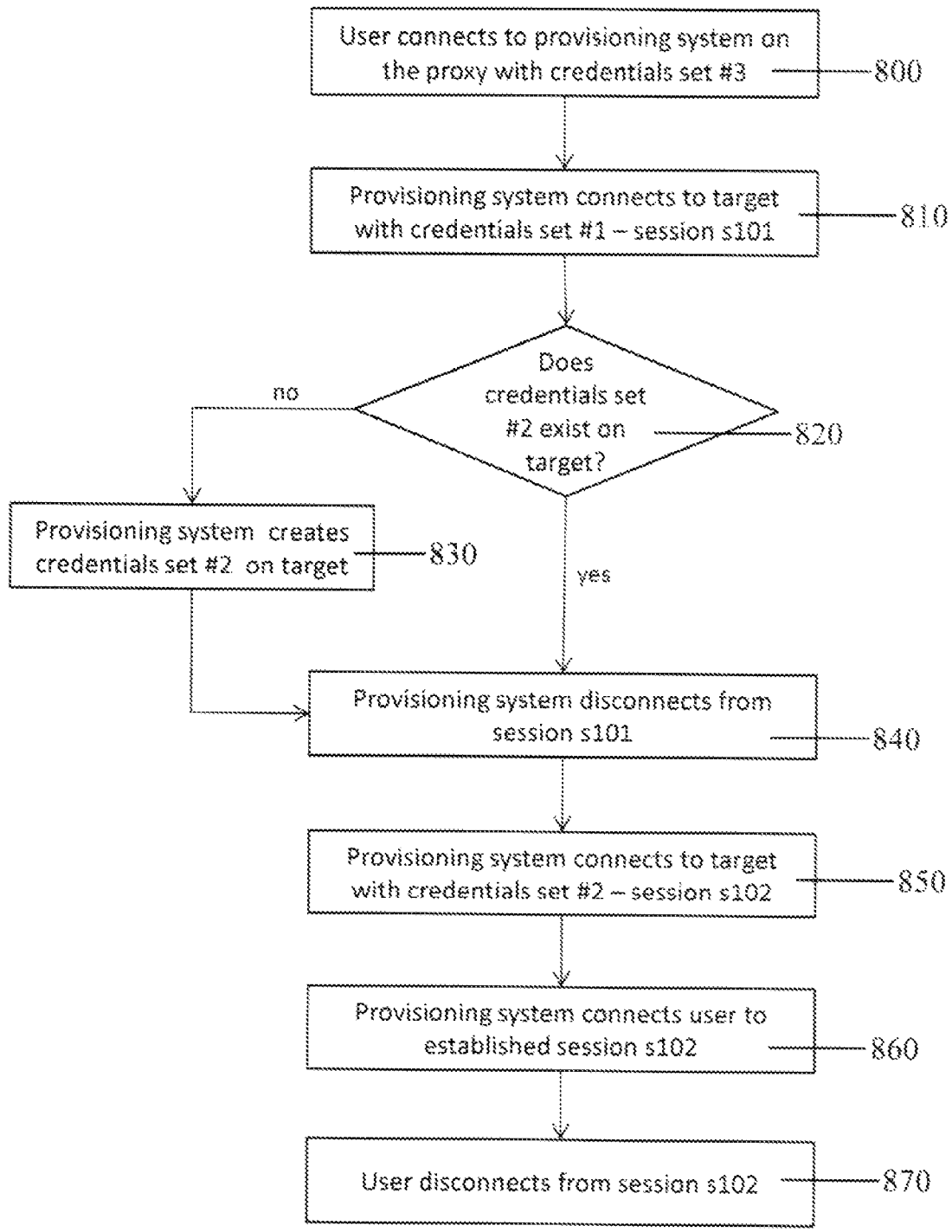
FIG. 8 is a simplified flowchart of a method for provisioning credentials for accessing a target service, according to embodiments of the invention.

Reference is now made to FIG. 7, which is a simplified system diagram illustrating credential management by a provisioning system located on a proxy server, according to embodiments of the invention. Reference is also made to FIG. 8, which is a simplified flowchart of a method for provisioning credentials for accessing a target service, according to respective embodiments of the invention.

Provisioning system 730 runs on proxy server 720. User 700 uses user client 710 to request session(s) with target service 740. Privileged credentials are stored in the provisioning system.

In 800 of FIG. 8, user 700 uses user client 710 to send a request to the provisioning system using authentication credentials (set #3). In 810 the provisioning system establishes session s101 with the target service using privileged credentials (set #1). In 820, the provisioning systems checks whether provisioned credentials already exist on the target service. When privileged credentials do not yet exist, in 830 provisioned credentials (set #2) are created on the target service (or server/machine hosting the target service). In 840 the provisioning system disconnects from s101. In 850-860 the provisioning establishes dual session s102 between the user client and the target service. In 870 the user client disconnects from session s102.

Figure 9:
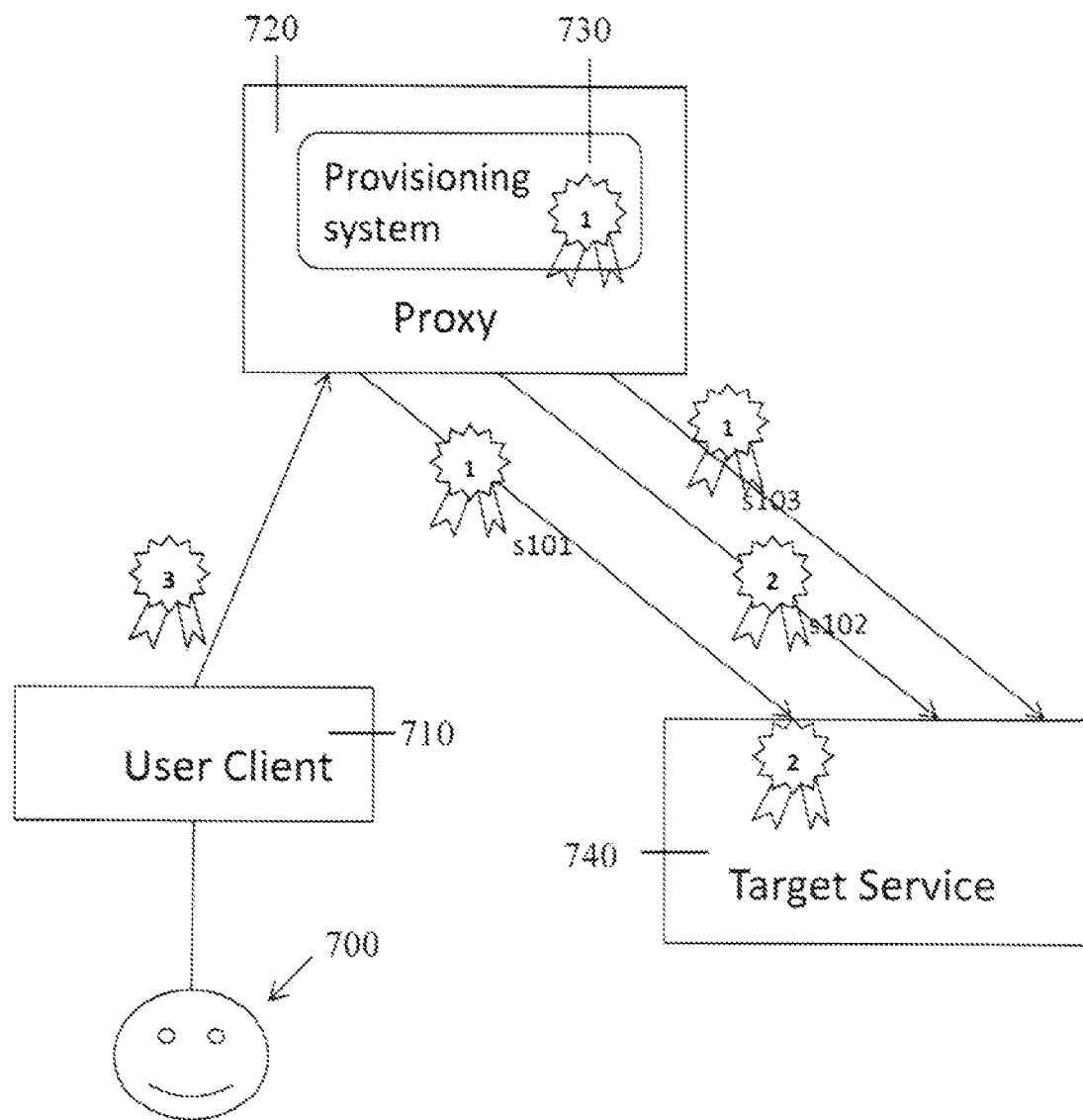
FIG. 9 is a simplified system diagram illustrating credential withdrawal by a provisioning system located on a proxy server, according to embodiments of the invention.
Figure 10:
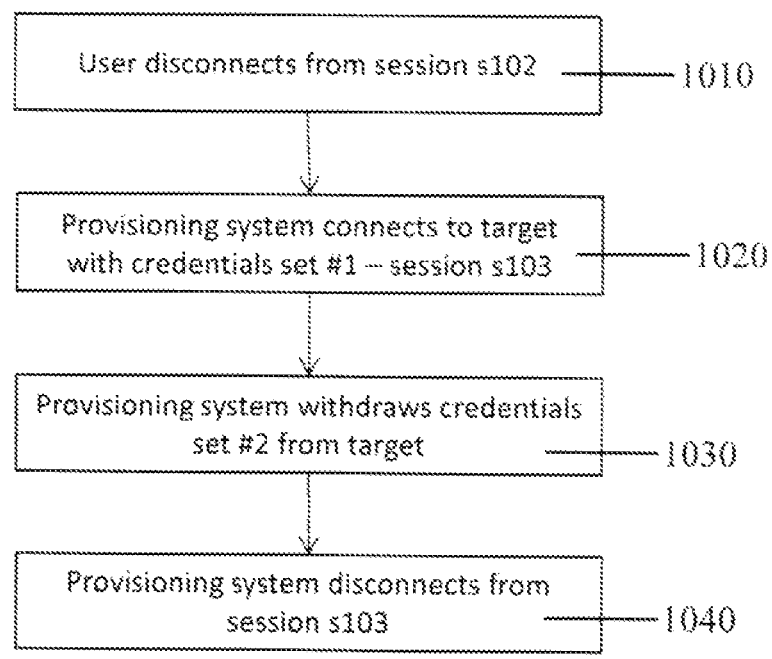
FIG. 10 is a simplified flowchart of a method for credential withdrawal, according to embodiments of the invention.

Optionally, the provisioning system withdraws the provisioned credentials from the target service when the session ends (one time access). Reference is now made to FIG. 9, which is a simplified system diagram illustrating credential withdrawal by a provisioning system located on a proxy server, according to embodiments of the invention. Reference is also made to FIG. 10, which is a simplified flowchart of a method for credential withdrawal, according to respective embodiments of the invention.

In addition to the sessions illustrated in FIG. 7, FIG. 9 includes an additional session s103 established by the provisioning system with the target service using privileged credentials (set #1), for the purpose of withdrawing set #2 from the target service. Optionally, credential withdrawal is performed after each user client session with the target service is terminated (e.g. 870 of FIG. 8) in order to provide the user with one-time access, in which provisioned credentials (set #2) are used only once. Optionally, a different set of provisioned credential is created every time the user is authenticated for a new session with the target service. Optionally, credential withdrawal is performed in a separate session, executed according to a schedule.

In 1010 of FIG. 10, it is detected that the user client has disconnected (e.g. closed session s102). In 1020, the provisioning system establishes a new session s103 with the target service. In 1030, the provisioning system withdraws set #2 from the target service. In 1040, the provisioning system disconnects from session #103.

Figure 11:
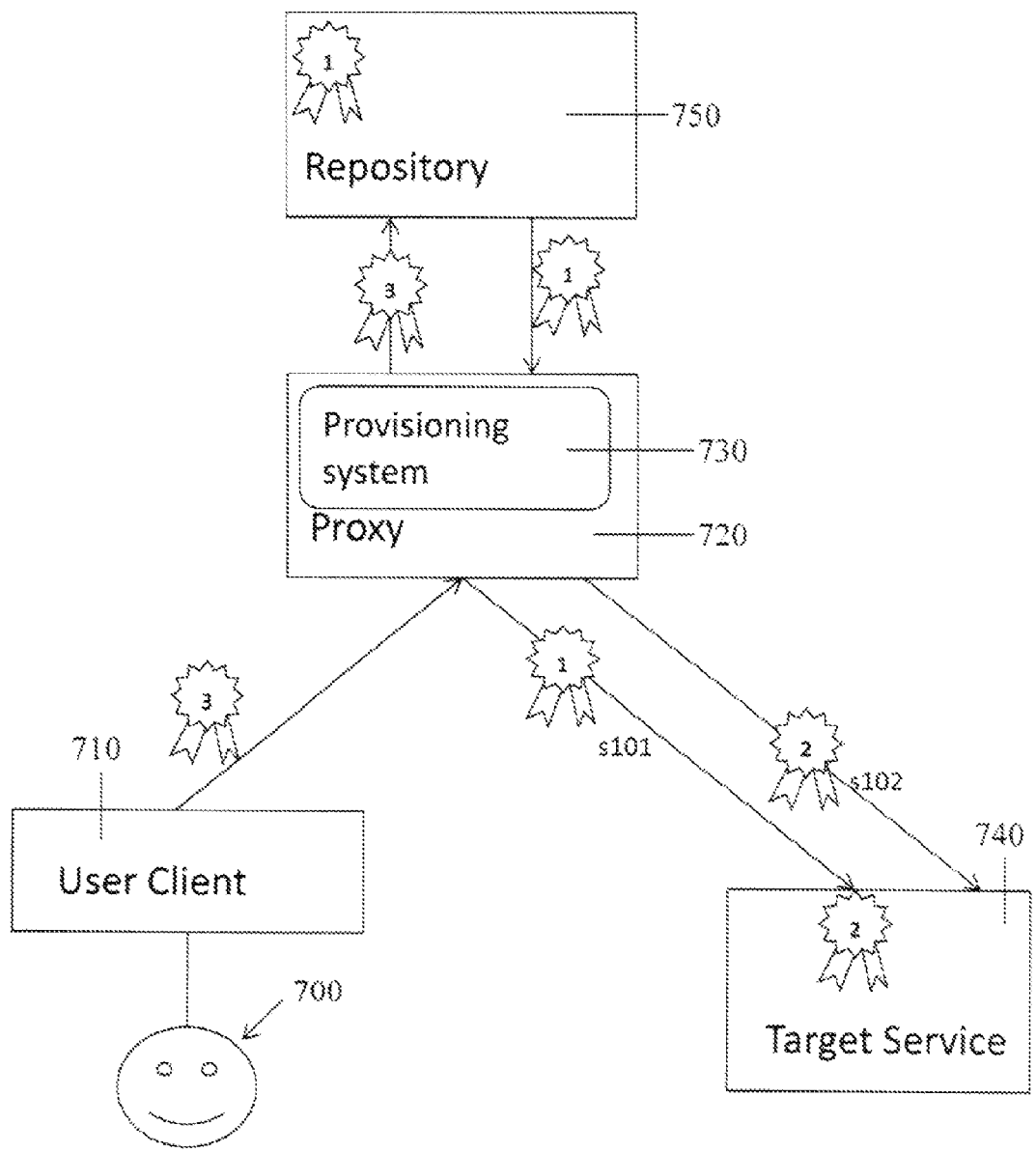
FIG. 11 is a simplified system diagram illustrating credential management by a provisioning system located on a proxy server, according to embodiments of the invention.
Figure 12:
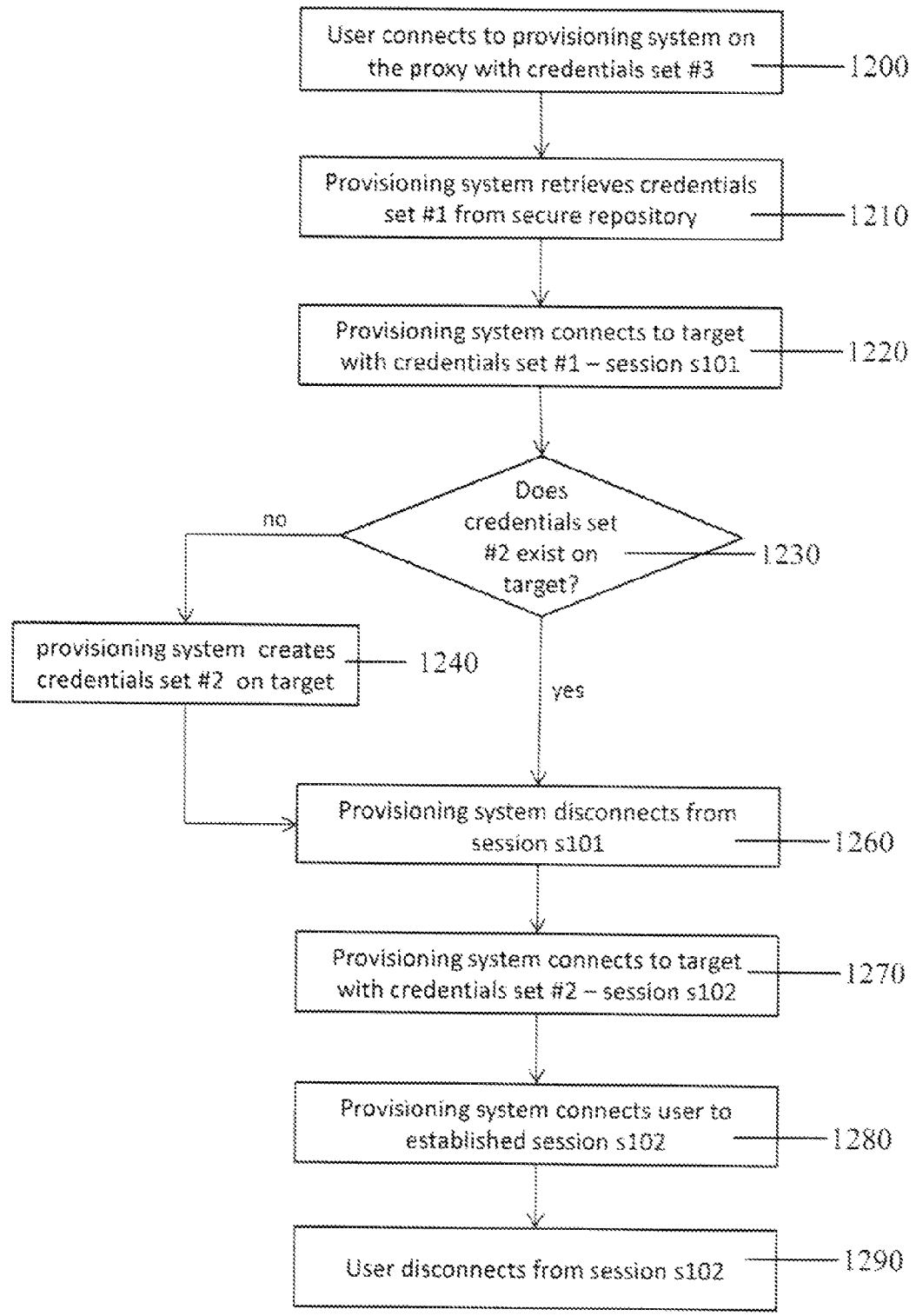
FIG. 12 is a simplified flowchart of a method for provisioning credentials for accessing a target service, according to embodiments of the invention.

Reference is now made to FIG. 11, which is a simplified system diagram illustrating credential management by a provisioning system located on a proxy server, according to embodiments of the invention. Reference is also made to FIG. 12, which is a simplified flowchart of a method for provisioning credentials for accessing a target service, according to respective embodiments of the invention. FIG. 11 includes credential repository 750, which stores privileged credentials and provides privileged credentials to the provisioning system. The user is authenticated to credential repository 750, such as PAMS, by any means known in the art (e.g. by providing authentication credentials set #3 to the credential repository as shown in FIG. 8). Only after credential repository 750 authenticates the user is the provisioning system able to extract the target service's privileged credentials (set #1) from the credit repository.

In FIGS. 12, 1200 and 1220-1290 correspond respectively to 800-870 of FIG. 8. FIG. 12 additionally includes 1210, in which the provisioning system retrieves credential set #1 from the repository.

Figure 13:
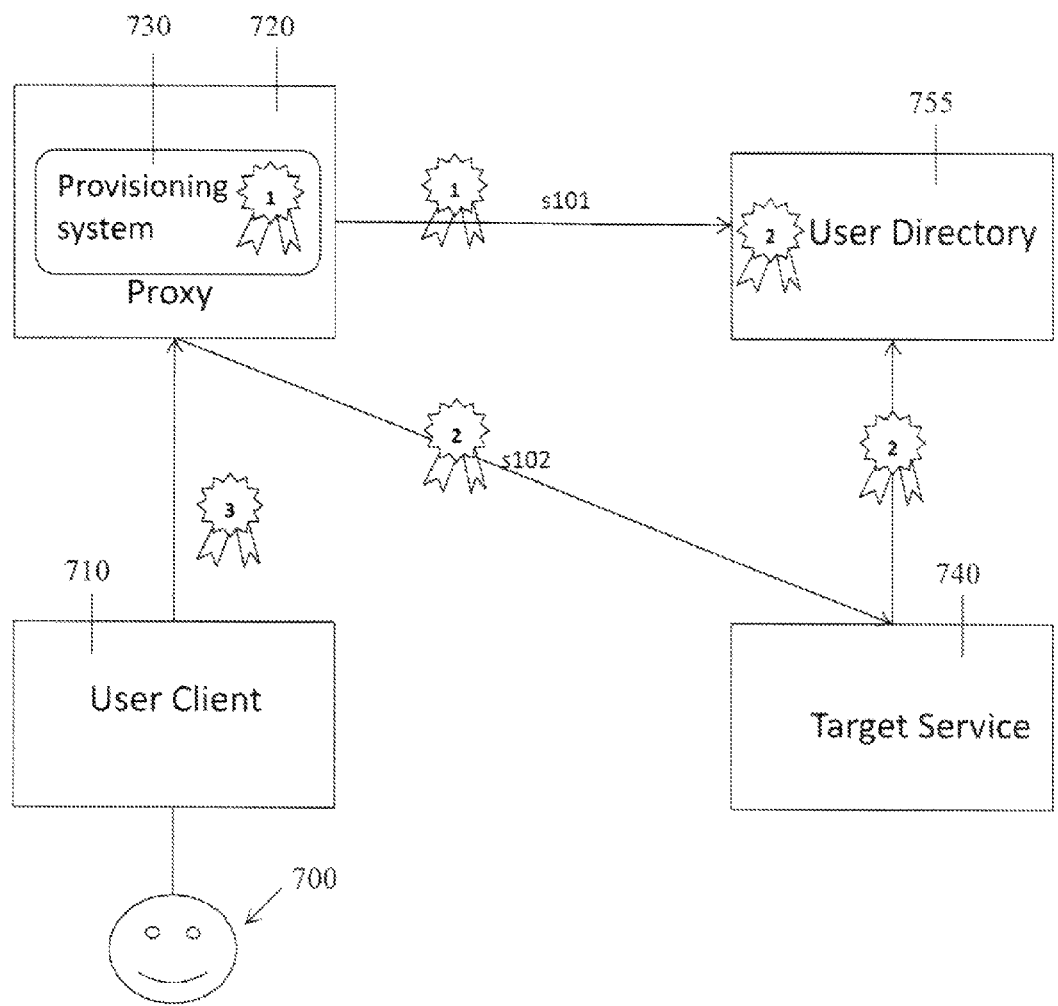
FIG. 13 is a simplified system diagram illustrating credential management by a provisioning system located on a proxy server, according to embodiments of the invention.
Figure 14:
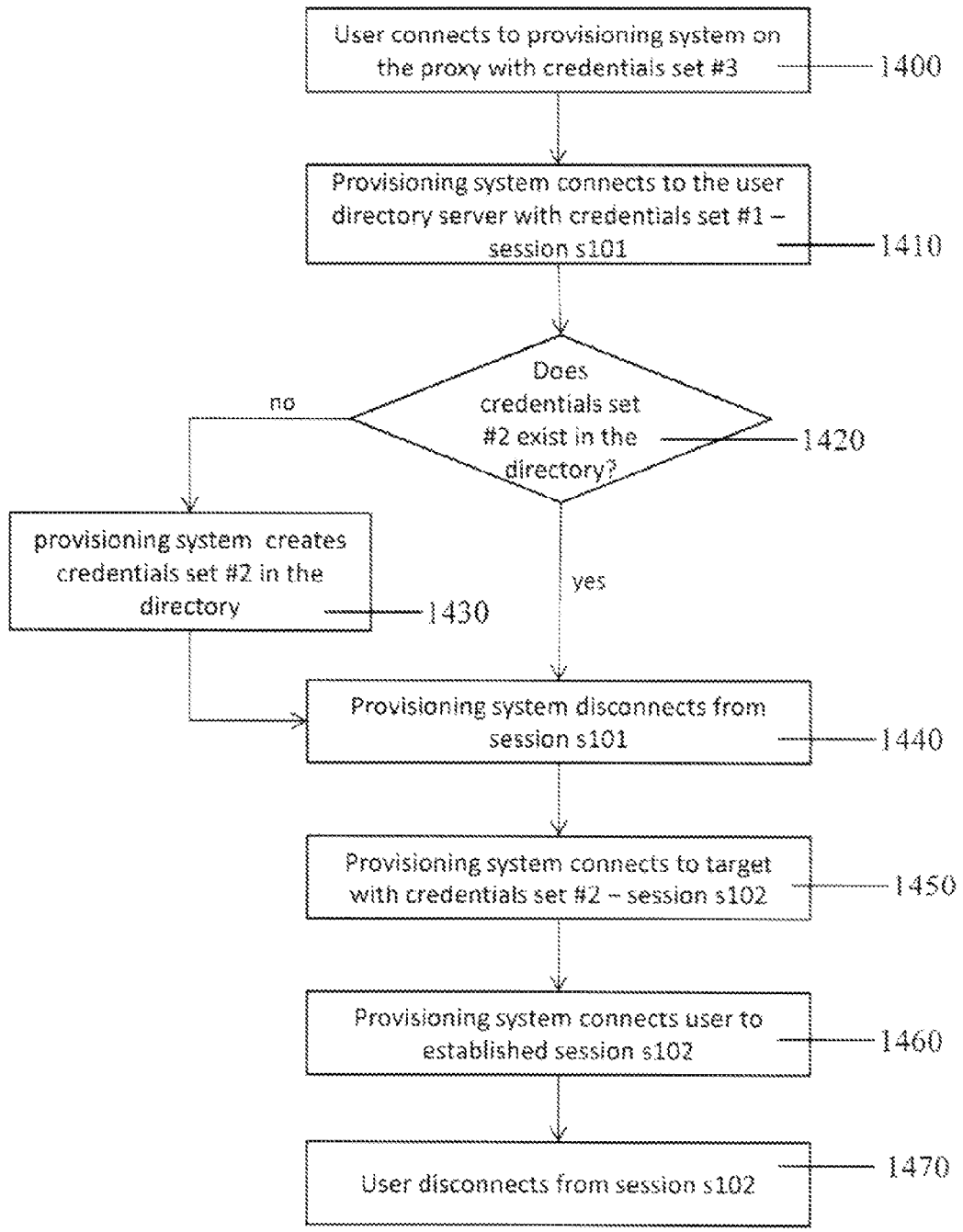
FIG. 14 is a simplified flowchart of a method for provisioning credentials for accessing a target service, according to embodiments of the invention.

Reference is now made to FIG. 13, which is a simplified system diagram illustrating credential management by a provisioning system located on a proxy server, according to embodiments of the invention. Reference is also made to FIG. 14, which is a simplified flowchart of a method for provisioning credentials for accessing a target service, according to respective embodiments of the invention.

FIG. 13 includes user directory 755, which maintains user accounts externally for the provisioning system. Provisioning system 730 uses the privileged credentials (set #1) to create a user account holding the user's provisioned credentials set #2 on user directory 755. User director is optionally accessible to the target service, to check whether the requested session may be opened with set #2.

In FIGS. 14, 1400 and 1450-1470 correspond respectively to 800 and 850-870 of FIG. 8. However, in FIG. 14 session s101 is conducted between the provisioning system and the user directory using set #1 (instead of the target service as in FIG. 8). In 1420, the provisioning systems checks whether provisioned credentials already exist in the user directory. When provisioned credentials do not yet exist, in 1430 provisioned credentials (set #2) are created on the user directory. In 1440, the provisioning system disconnects from the user directory and session s101 is closed.

Figure 15:
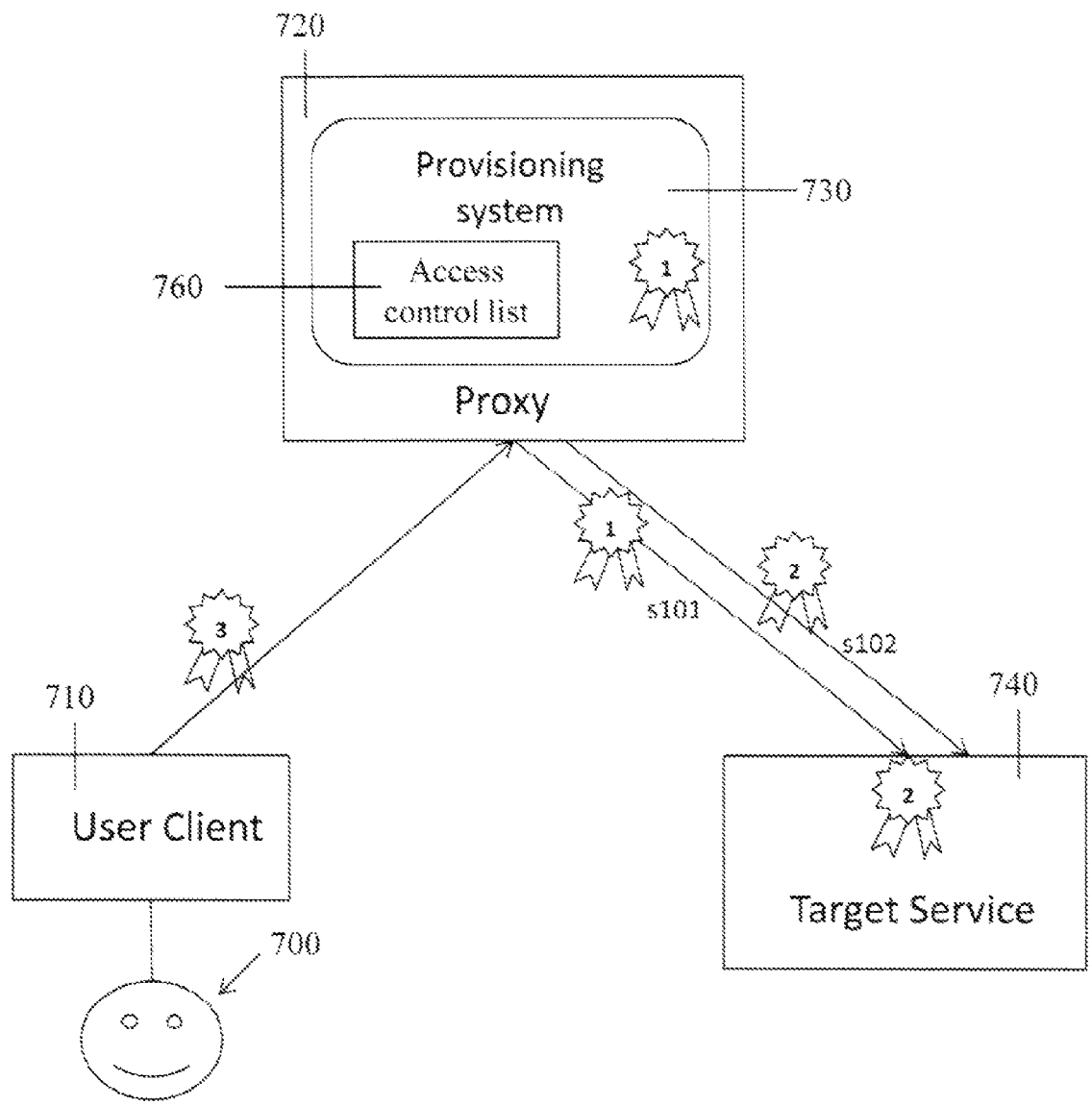
FIG. 15 is a simplified system diagram illustrating access control and credential management by a provisioning system located on a proxy server, according to embodiments of the invention.
Figure 16A:
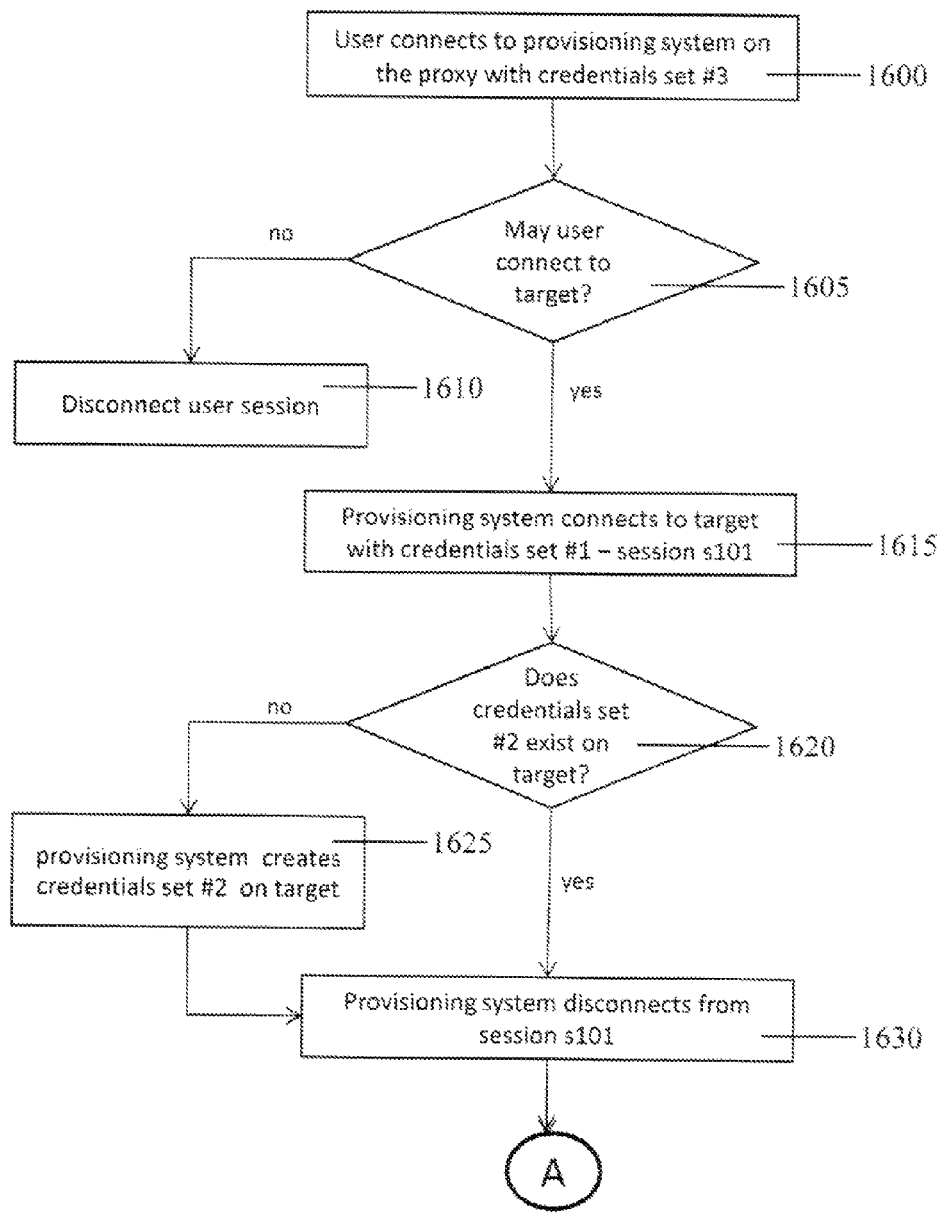
FIGS. 16A-16B together are a simplified flowchart of a method for access control and credential management, according to embodiments of the invention.
Figure 16B:
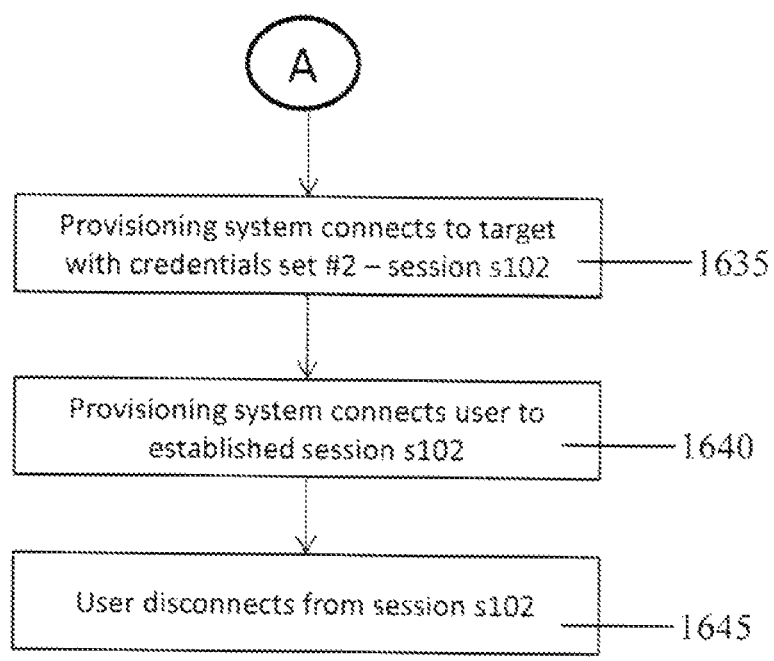

Optionally, the provisioning system enforces an access control policy. Reference is now made to FIG. 15, which is a simplified system diagram illustrating access control and credential management by a provisioning system located on a proxy server, according to embodiments of the invention. Reference is also made to FIGS. 16A-16B, which is a simplified flowchart of a method for access control and credential management, according to respective embodiments of the invention. In an optional embodiment, provisioning system manages an access control list 760 for access control and credential management for users that have permission access to target services. Privileged credentials are stored in the provisioning system.

In the embodiments of FIGS. 15-16B, when a user client requests to establish a session the provisioning system checks its access control list to determine whether the user has permission to access a target service. Only if the user has permission to access the target service is the proxy server permitted to establish the remote session.

In FIGS. 16A-16B, 1600 and 1615-1645 correspond respectively to 800-870 of FIG. 8. FIG. 16 additionally includes 1605 and 1610. In 1605, the provisioning systems checks access control list 760 to determine whether the user is permitted access to the target service. In 1610, when access is not permitted the user session with the provisioning system is disconnected.

User Client with Provisioning System

FIGS. 17-20 are simplified system diagrams and flowcharts illustrating user provisioning with a provisioning system on a user client, according to embodiments of the invention. Provisioning system 1720 is integrated into user client 1710 in a manner that prevents a user logged in to the user client from accessing privileged credentials. Once the provisioned credentials have been created on the target service, the user will not be able to log in to the target service with any other remote application as the user was never exposed to the privileged credentials.

Figure 17:
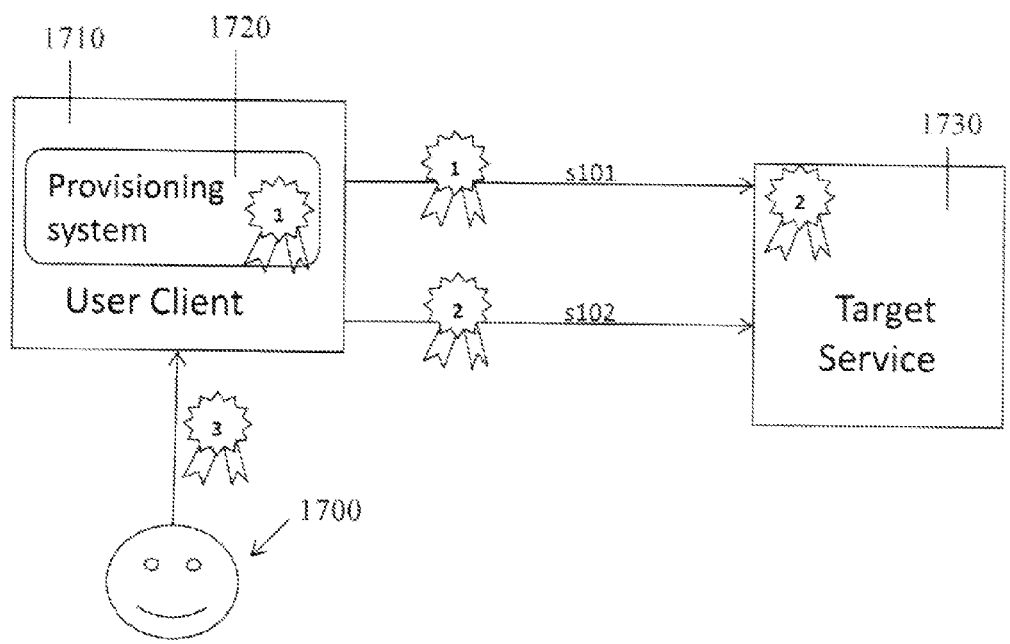
FIG. 17 is a simplified system diagram illustrating credential management by a provisioning system located in a user client, according to embodiments of the invention.
Figure 18A:
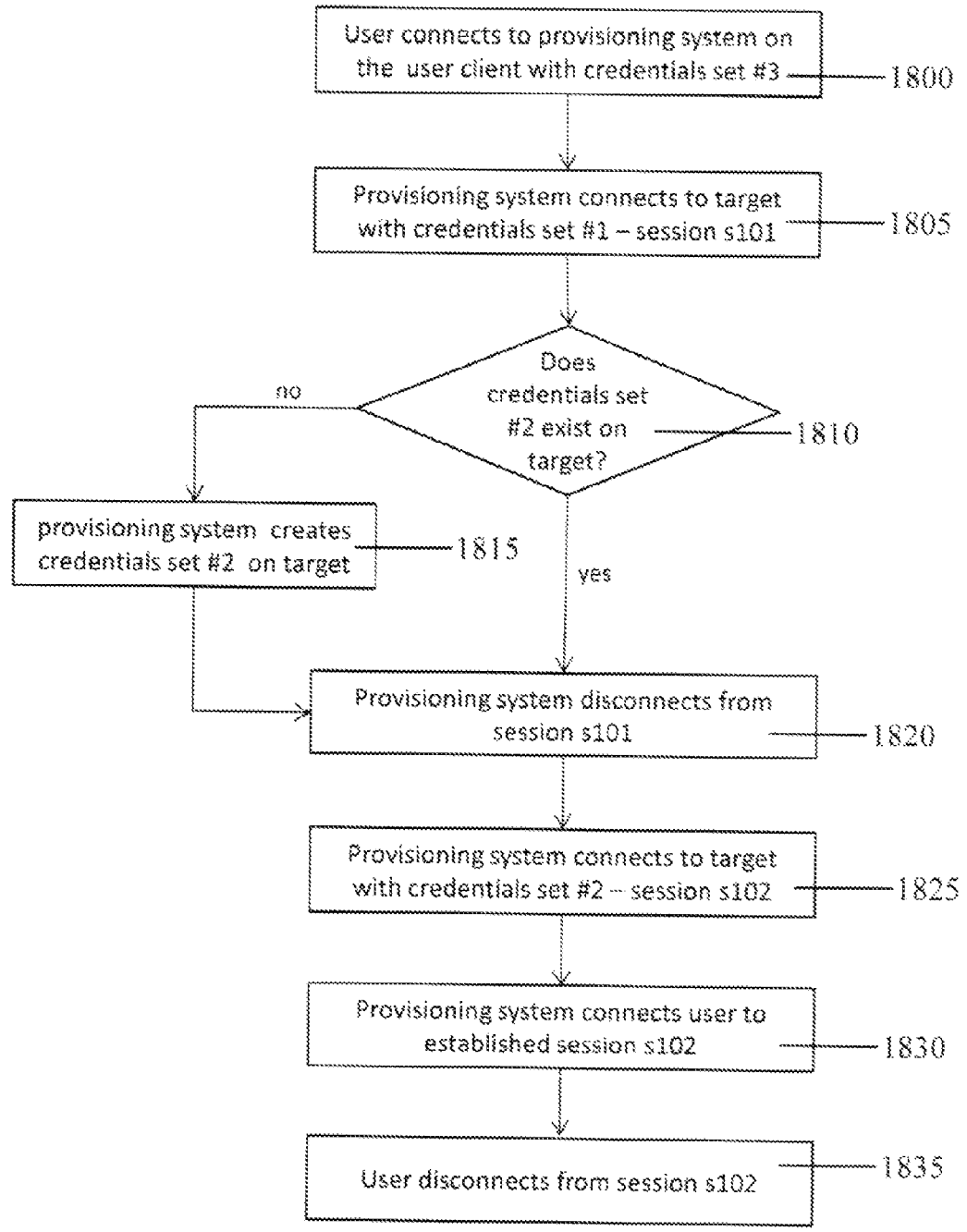
FIG. 18A is a simplified flowchart of a method for provisioning credentials for accessing a target service, according to respective embodiments of the invention.

Reference is now made to FIG. 17, which is a simplified system diagram illustrating credential management by a provisioning system located in a user client, according to embodiments of the invention. Reference is also made to FIG. 18A, which is a simplified flowchart of a method for provisioning credentials for accessing a target service, according to respective embodiments of the invention.

Provisioning system 1720 runs on user client 1710. Privileged credentials are stored in provisioning system 1720. In order to open a session (e.g. RDP/SSH/Web) on target service 1730, user 1700 connects to user client 1710 with authentication credentials set #3. Transparently to the user, provisioning system 1720 uses the stored privileged credentials (set #1) to open session s101 with the target service 1730. The provisioning system creates provisioned credentials (set #2) on the target service 1730, and initiates the session s102 using provisioned credential set #2. The provisioning system may generate provisioned credentials internally (e.g. random credentials) and/or store provisioned credentials in an internal directory.

Optionally, provisioning system 1720 does not use any kind of element or software installed on the target service and provides on-demand user provisioning.

In 1800 of FIG. 18A, the user connects to provisioning system on the user client with credentials set #3 and requests to access the target service. In FIG. 18A, 1805-1835 substantially correspond to 810-870 respectively of FIG. 8, with the distinction that the provisioning system is on the user client not on a proxy server.

Figure 18B:
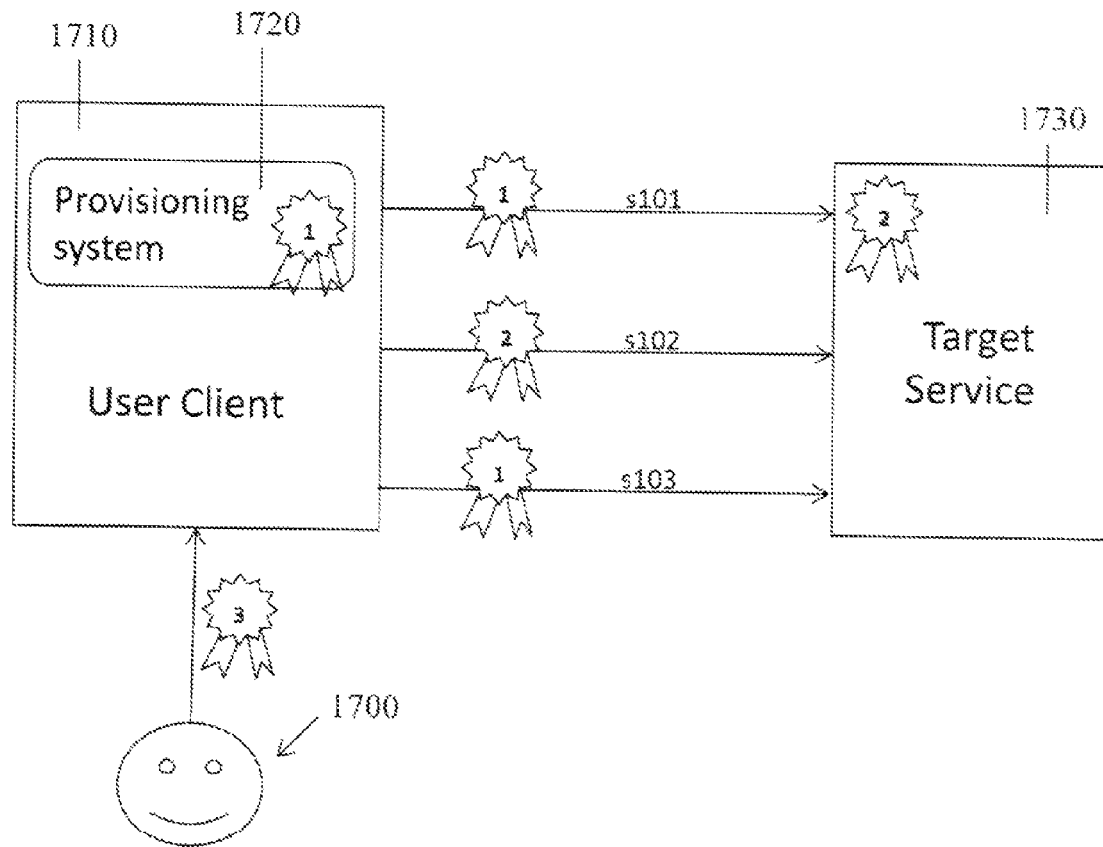
FIG. 18B is a simplified system diagram illustrating credential withdrawal by a provisioning system located in a user client, according to embodiments of the invention.

Optionally, the provisioning system withdraws the provisioned credentials from the target service when the session ends (one time access). Reference is now made to FIG. 18B, which is a simplified system diagram illustrating credential withdrawal by a provisioning system located on a user client, according to embodiments of the invention. In addition to the sessions illustrated in FIG. 17, FIG. 18B includes an additional session s103 established by the provisioning system with the target service using privileged credentials (set #1), for the purpose of withdrawing set #3 from the target service.

Figure 18C:
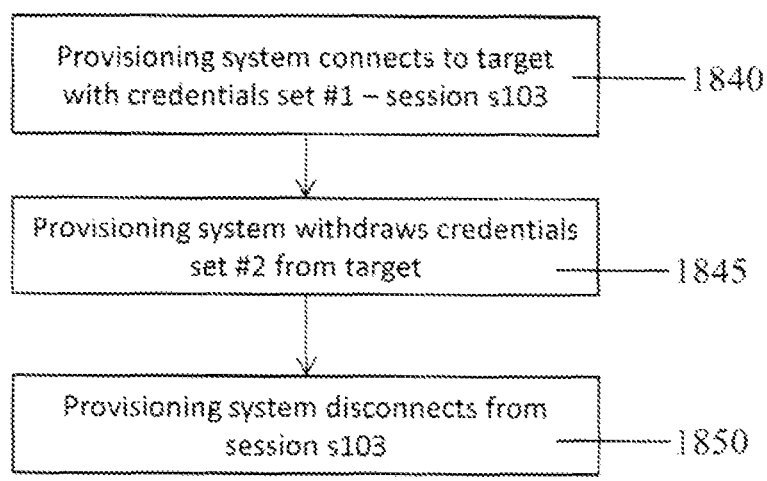
FIG. 18C is a simplified flowchart of a method for credential withdrawal, according to respective embodiments of the invention.

Reference is now made to FIG. 18C, which is a simplified flowchart of a method for credential withdrawal when a user client disconnects from a target service, according to respective embodiments of the invention. Similarly to the embodiment of FIG. 10, a third session with the target service (s103) is established by provisioning system 1720 to withdraw the credentials from the target service. In FIG. 18C, 1840-1850 substantially correspond to 1020-1040 respectively of FIG. 10, with the distinction that the provisioning system is on the user client not on a proxy server.

Optionally, for one-time access different provisioned credentials (set #2) are created every time user wants to authenticate himself and are used only once.

Figure 19:
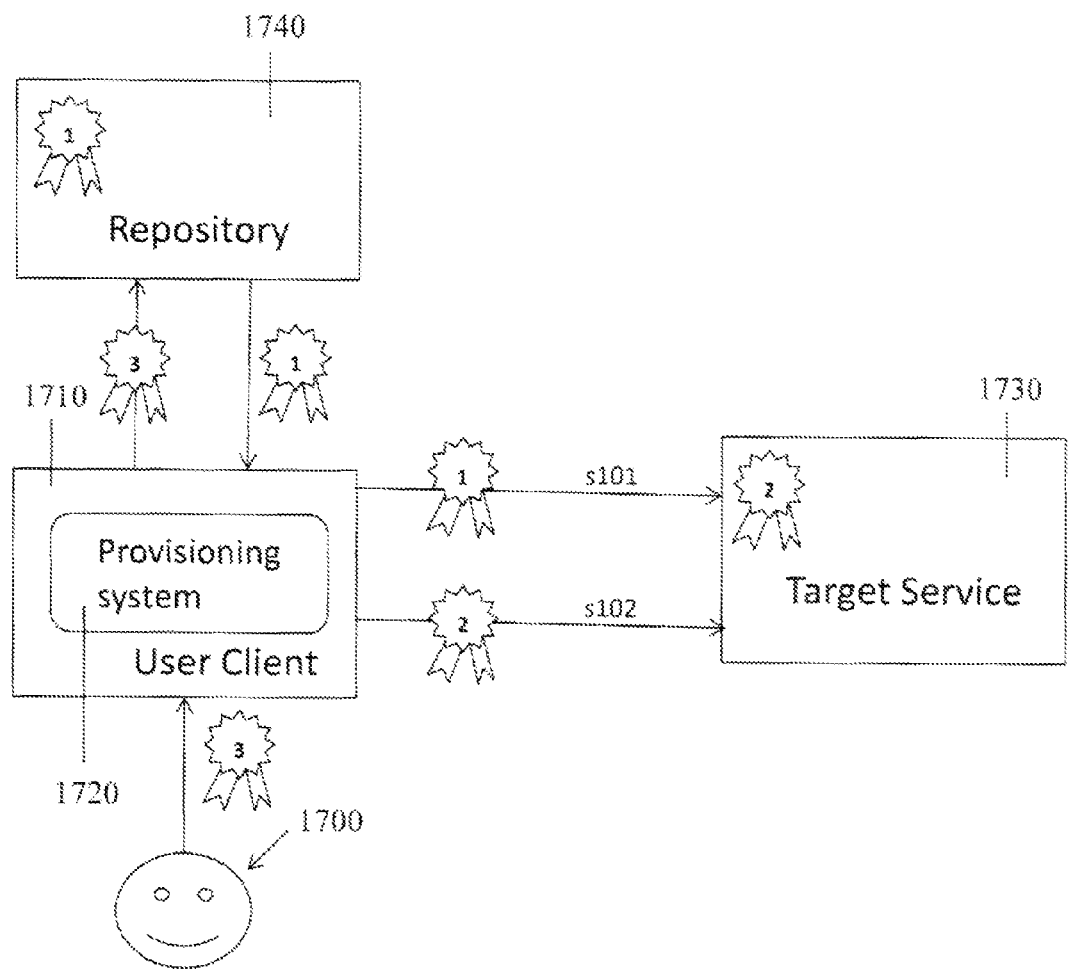
FIG. 19 is a simplified system diagram illustrating credential management and authentication by a provisioning system located in a user client, according to embodiments of the invention.
Figure 20:
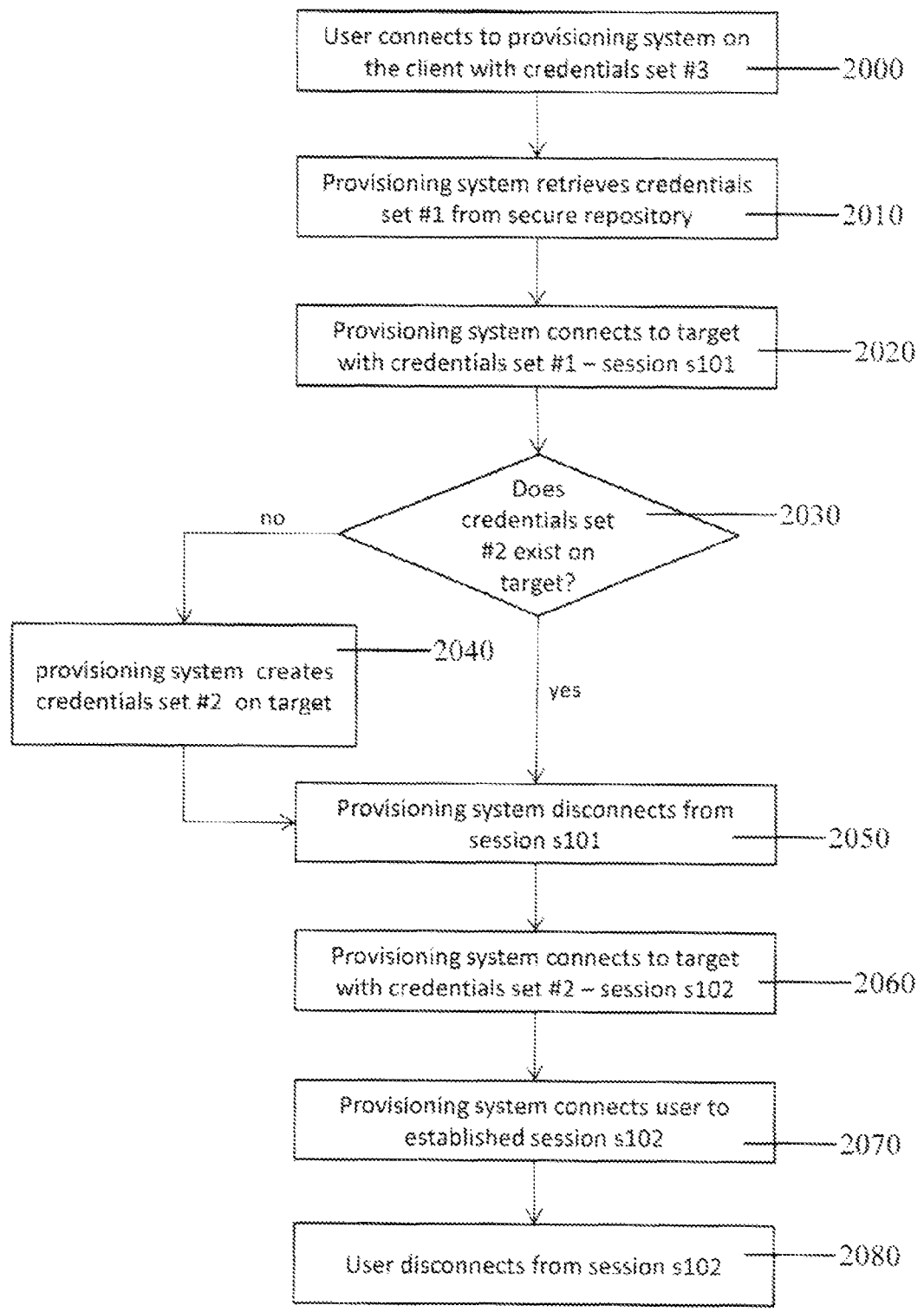
FIG. 20 is a simplified flowchart of a method for provisioning credentials for accessing a target service, according to respective embodiments of the invention.

Reference is now made to FIG. 19, which is a simplified system diagram illustrating credential management and authentication by a provisioning system located in a user client, according to embodiments of the invention. Reference is also made to FIG. 20, which is a simplified flowchart of a method for provisioning credentials for accessing a target service, according to respective embodiments of the invention.

In the embodiment of FIGS. 19 and 20, the user connects to provisioning system on the user client with authentication credentials set #3. The privileged credentials used by provisioning system 1720 to establish a session with target service 1730 are extracted from credentials repository 1740 after the user is authenticated by the credential repository, substantially as described for FIGS. 11 and 12 above with the distinction that the provisioning system is on the user client not on a proxy server.

Target Service with Provisioning System

In some embodiments, the provisioning system is integrated into a target service, in a manner that prevents the user client from accessing privileged credentials.

Figure 21:
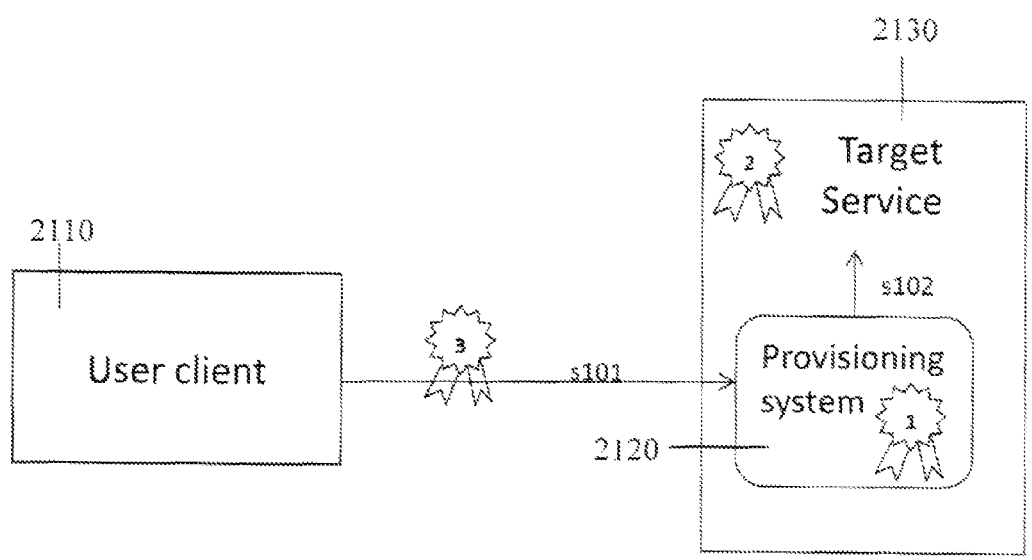
FIG. 21 is a simplified system diagram illustrating credential management by a provisioning system located in a target service, according to embodiments of the invention.

Reference is now made to FIG. 21, which is a simplified system diagram illustrating credential management by a provisioning system located in a target service, according to embodiments of the invention. Privileged credentials (set #1) are stored in provisioning system 2120, or are otherwise accessible to provisioning system 2120 (for example from PAMS). The user client 2110 has authentication credentials set#3 which it uses to open session s101 with provisioning system 2120. Provisioning system 2120 uses the privileged credentials (set #1) to open session s102 with the target service 2130. The provisioning system creates provisioned credentials (set #2) on the target service 2130, and connects the user client 2110 to s102 using provisioned credential set #2.

Figure 22:
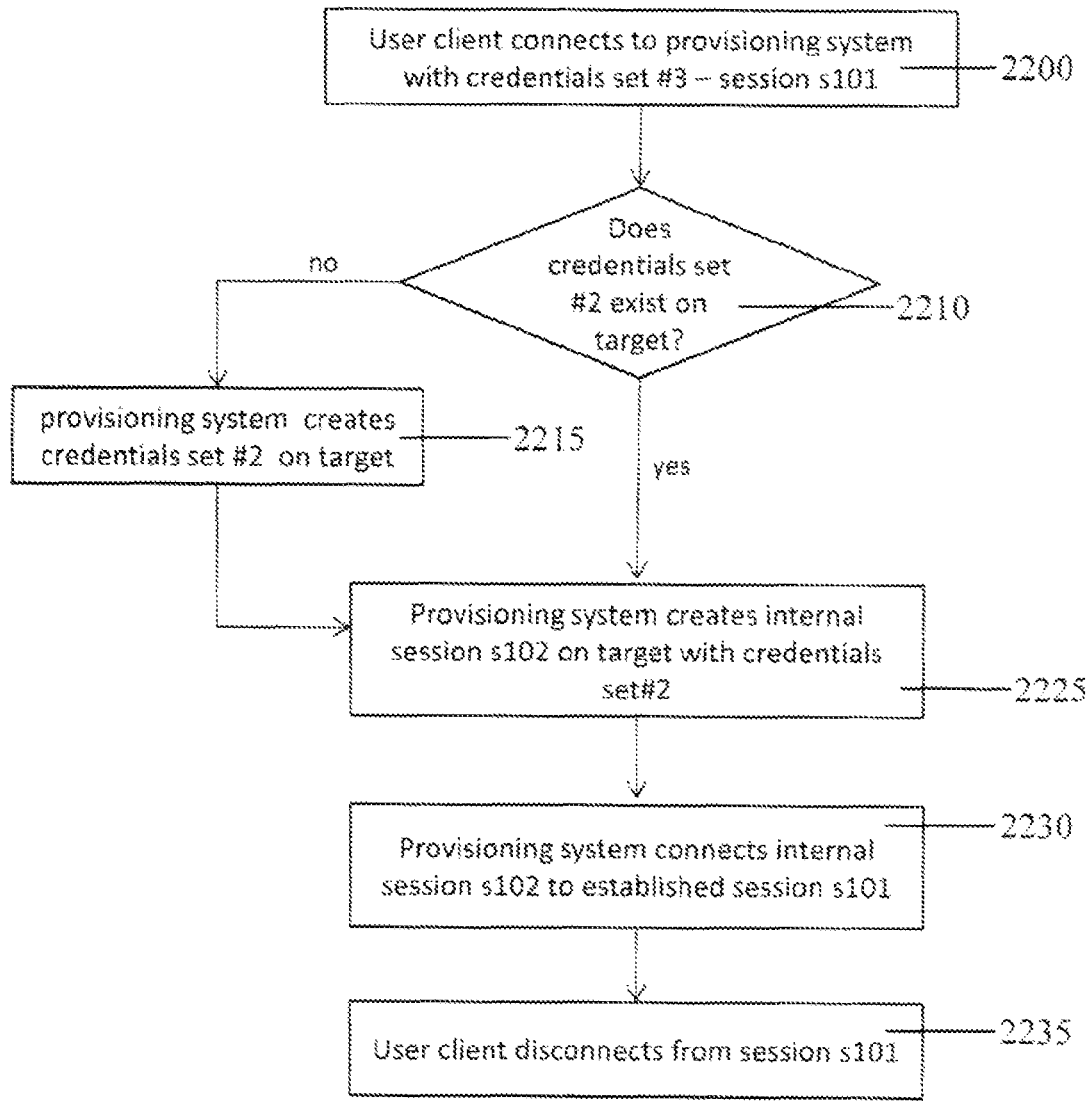
FIG. 22 is a simplified flowchart of a method for provisioning credentials for accessing a target service, according to embodiments of the invention.

Reference is now made to FIG. 22 which is a simplified flowchart of a method for credential management with a provisioning system on a target service, according to embodiments of the invention.

In 2200 of FIG. 22, the user client connects to the provisioning system on the target service with credentials set #3 and requests to access the target service. In 2210, the provisioning systems checks whether provisioned credentials already exist on the target service. When privileged credentials do not yet exist, in 2215 provisioned credentials (set #2) are created on the target service. In 2225 the provisioning system creates internal session s102 with the target service using the provisioned credentials (set #2). In 2230 the provisioning system connects internal session s102 to established session s101. In 2235 the user client disconnects from session s101.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant user clients, protocols, authentication systems, user endpoints, proxy servers and target services will be developed and the scope of the term user client, protocol, authentication system, user endpoint, proxy server and target service is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of credential provisioning on a target service, comprising:
   receiving at an intermediate element, from a user client, a request to establish a session with a specified target service, wherein said request comprises authentication credentials;
   in response to said received request: obtaining, by said intermediate element and based on said authentication credentials, privileged credentials authorized for provisioning new credentials to access said target service, generating a new set of provisioned credentials enabling said intermediate element to establish a session with said target system and, by using said privileged credentials, registering said new set of provisioned credentials for authentication with said target service; and
   establishing, by said intermediate element, said session with said target service using said new set of provisioned credentials.

2. A method according to claim 1, wherein said session comprises a dual-session communication channel comprising a first communication session established between said user client and said intermediate element using said authentication credentials, and a second communication session established between said intermediate element and said target service using said new set of provisioned credentials.

3. A method according to claim 2, wherein establishing said second session comprises connecting to said target service with said new set of provisioned credentials.

4. A method according to claim 2, wherein establishing said second session comprises connecting to said target service using said privileged credentials and using said new set of provisioned credentials in a local session on said target service.

5. A method according to claim 1, further comprising identifying said target service from at least one of:
   i) an identifier in said request; and
   ii) analysis of said request by said intermediate element.

6. A method according to claim 1, wherein said user client comprises an application.

7. A method according to claim 1, wherein said authentication credentials are null credentials.

8. A method according to claim 1, further comprising detecting a termination of said first communication session and, in response to said detecting, withdrawing said new set of provisioned credentials from said target service.

9. A method according to claim 1, wherein said new set of provisioned credentials are generated on said target service.

10. A method according to claim 9, further comprising, determining, in response to said request, the existence or absence of provisioned credentials for said user client for said target service, and:
    i) when said provisioned credentials are absent, generating said new set of provisioned credentials for said user client;
    ii) when said provisioned credentials are present and a specified logic requires new provisioned credentials, generating said new set of provisioned credentials for said user client; and
    iii) when said provisioned credentials are present and a specified logic does not require new provisioned credentials, using said existing provisioned credentials for said user client.

11. A method according to claim 1, wherein said new set of provisioned credentials are generated on said intermediate element and registered with a user directory accessed by said target service to validate said new set of provisioned credentials.

12. A method according to claim 1, wherein said new set of provisioned credentials are generated on said intermediate element and registered with said target service.

13. A method according to claim 1, further comprising determining an authorization to access said target service prior to generating said new set of provisioned credentials, wherein said new set of provisioned credentials are generated based on said authorization.

14. A method according to claim 1, further comprising monitoring a session established with said new set of provisioned credentials and attributing actions performed during said monitored session to said user client.

15. A method according to claim 1, further comprising, at said target service, denying a request to establish a direct session with said user client when said authentication credentials are used.

16. A method according to claim 1, further comprising, by said intermediate element, determining a validity of said authentication credentials with at least one of a group comprising:
  i) a privileged account management system (PAMS);
  ii) a user directory;
  iii) a local credential repository; and
  iv) a customized authentication module.

17. A method according to claim 1, further comprising, by said intermediate element, retrieving said privileged credentials from a PAMS.

18. A method according to claim 1, wherein said intermediate element is on one of:
  i) a server functioning as a proxy between the user client and target service;
  ii) a machine on which said user client resides; and
  iii) said target service.

19. A method according to claim 1, wherein said generating a new set of provisioned credentials comprises associating said new set of provisioned credentials with a corresponding authorization, said authorization defining resources accessible with said new set of provisioned credentials, such that said session is established with said corresponding authorization.

20. A method according to claim 1, wherein said generating a new set of provisioned credentials comprises provisioning an account associated with said new set of provisioned credentials on said target service.

21. A provisioning system, comprising:
  at least one non-transitory computer readable storage medium storing instructions; and
  at least one hardware processor adapted to execute said instructions to:
  to receive a request from a user client to establish a session with a specified target service, wherein said request comprises authentication credentials;
  in response to said request:
    to obtain, based on said authentication credentials, privileged credentials authorized for provisioning new credentials to access said target service;
    to generate a new set of provisioned credentials for establishing a session with said target system; and
    to register, by using said privileged credentials, said new set of provisioned credentials for authentication with said target service; and
    to establish a session with said target service using said new set of provisioned credentials.

22. A provisioning system according to claim 21, wherein said session comprises a dual-session communication channel comprising a first communication session established between said user client and said intermediate element using said authentication credentials, and a second communication session established between said intermediate element and said target service using said new set of provisioned credentials.

23. A provisioning system according to claim 22, wherein said session management module is configured to establish said second session by one of:
  i) connecting to said target service with said new set of provisioned credentials; and
  ii) connecting to said target service using said privileged credentials and using said new set of provisioned credentials in a local session on said target service.

24. A provisioning system according to claim 21, wherein said wherein said processor is further adapted to execute said instructions to identify said target service from at least one of:
  i) an identifier in said request; and
  ii) analysis of said request.

25. A provisioning system according to claim 21, further comprising a network interface for electrical communication with at least one of a user client and a system node running a target service.

26. A provisioning system according to claim 21, wherein said user client comprises an application.

27. A provisioning system according to claim 21, wherein said processor is further adapted to execute said instructions to perform at least one of:
  i) generating said new set of provisioned credentials on said target service during a communication session with said target service established using said privileged credentials;
  ii) registering said new set of provisioned credentials with a user directory accessed by said target service to validate said new set of provisioned credentials; and
  iii) registering said new set of provisioned credentials with said target service.

28. A provisioning system according to claim 21, wherein said processor is further adapted to execute said instructions to detect a termination of said first communication session and, in response to said detecting, to withdraw said new set of provisioned credentials from said target service.

29. A provisioning system according to claim 21, wherein said processor is further adapted to execute said instructions to monitor a session established with said new set of provisioned credentials and attribute actions performed during said monitored session to said user client.

30. A provisioning system according to claim 21, wherein said processor is further adapted to execute said instructions to determine a validity of said authentication credentials with at least one of a group comprising:
  i) a privileged account management system (PAMS);
  ii) a user directory;
  iii) a local credential repository; and
  iv) a customized authentication module.

31. A provisioning system according to claim 21, wherein said processor is further adapted to execute said instructions to retrieve said privileged credentials from a PAMS credential repository.

32. A provisioning system according to claim 21, wherein said provisioning system runs on one of:

i) a proxy server inline between said user client and said target service;
ii) a user endpoint running on said user client; and
iii) said target service.

33. A provisioning system according to claim 21, wherein said new set of provisioned credentials are associated with a corresponding authorization, said corresponding authorization defining resources accessible with said new set of provisioned credentials, such that said session is established with said corresponding authorization.

34. A provisioning system according to claim 21, wherein said new set of provisioned credentials comprise a new account on said target service.

35. A computer product for provisioning credentials on a target service, comprising:
- a computer readable storage medium;
- first program instructions to receive, at an intermediate element, a request from a user client to establish a session with a specified target service, wherein said request comprises authentication credentials;
- second program instructions to obtain in response to said request, by said intermediate element and based on said authentication credentials, privileged credentials authorized for provisioning new credentials to access said target service; and
- third program instructions to generate a new set of provisioned credentials for establishing a session with said target system; and
- fourth program instructions to register, by using said privileged credentials, said new set of provisioned credentials for authentication with said target service;
- fifth program instructions to establish, by said intermediate element, said session with said target service using said new set of provisioned credentials;
- wherein said first, second, third, fourth and fifth program instructions are stored on said computer readable storage medium.

36. A computer product according to claim 35, wherein said session comprises a dual-session communication channel comprising a first communication session established between said user client and said intermediate element using said authentication credentials, and a second communication session established between said intermediate element and said target service using said new set of provisioned credentials.

37. A computer product according to claim 35, wherein said new set of provisioned credentials are associated with a corresponding authorization, said corresponding authorization defining resources accessible with said new set of provisioned credentials, such that said session is established with said corresponding authorization.

38. A computer product according to claim 35, wherein said new set of provisioned credentials comprise a new account on said target service.

* * * * *